US008477345B2

(12) United States Patent
Endruscheit et al.

(10) Patent No.: US 8,477,345 B2
(45) Date of Patent: Jul. 2, 2013

(54) METHOD FOR PRODUCING A LABEL, COMPUTER PROGRAM PRODUCT, NETWORK NODE AND SYSTEM FOR CARRYING OUT THE METHOD

(75) Inventors: Henning Endruscheit, Merzenich (DE); Volker Klös, Langgons (DE); Thomas Ogilvie, Bonn (DE); Boris Mayer, Bonn (DE)

(73) Assignee: Deutsche Post AG, Bonn (DE)

( * ) Notice: Subject to any disclaimer, the term of this patent is extended or adjusted under 35 U.S.C. 154(b) by 893 days.

(21) Appl. No.: 12/447,264

(22) PCT Filed: Oct. 23, 2007

(86) PCT No.: PCT/EP2007/009183

§ 371 (c)(1), (2), (4) Date: Oct. 6, 2009

(87) PCT Pub. No.: WO2008/049579

PCT Pub. Date: May 2, 2008

(65) Prior Publication Data

US 2010/0067041 A1 Mar. 18, 2010

(30) Foreign Application Priority Data

Oct. 27, 2006 (EP) .................................... 06022477

(51) Int. Cl.

| | |
|---|---|
| ***G06F 3/12*** | (2006.01) |
| ***G06F 17/00*** | (2006.01) |
| ***G06F 12/14*** | (2006.01) |
| ***G06F 12/16*** | (2006.01) |
| ***G06F 9/00*** | (2006.01) |
| ***G06Q 20/00*** | (2012.01) |
| ***G07B 17/02*** | (2006.01) |

(52) U.S. Cl.
USPC ................ 358/1.15; 705/60; 705/61; 705/62; 705/401; 705/404; 705/405; 705/408; 705/410; 705/411

(58) Field of Classification Search
None
See application file for complete search history.

(56) References Cited

U.S. PATENT DOCUMENTS 5,771,289 A * 6/1998 Kuzma .......................... 713/153
6,671,813 B2 * 12/2003 Ananda ............................ 726/3

(Continued)

FOREIGN PATENT DOCUMENTS

DE 102004046051 A1 3/2006
DE 102004046051 A1 * 3/2006

(Continued)

*Primary Examiner* — King Poon
*Assistant Examiner* — Vincent Peren
(74) *Attorney, Agent, or Firm* — International IP Law Group, PLLC

(57) ABSTRACT

There is provided a method and system for producing a label that can be applied onto a mailpiece. An exemplary method comprises providing a data service via a network node, the data service being performed in a provider server of a service provider. The exemplary method also comprises performing a one-time printing of the label via a control program, such that an intelligent document is transmitted from the provider server via a network to a user client, the one-time printing being done if a network connection exists between the user client and the provider server, and if, on the basis of a query to the provider server, it has been ascertained that that label had not been printed before. The exemplary method additionally comprises transmitting a message from the user client to the provider server when the label is printed for the first time. The exemplary method further comprises logging the printing in the provider server in response to the message.

11 Claims, 5 Drawing Sheets

U.S. PATENT DOCUMENTS

| | | | | |
|---|---|---|---|---|
| 7,319,989 | B2 * | 1/2008 | Athens et al. | 705/62 |
| 2002/0023057 | A1 * | 2/2002 | Goodwin et al. | 705/50 |
| 2002/0035697 | A1 * | 3/2002 | McCurdy et al. | 713/200 |
| 2002/0178126 | A1 * | 11/2002 | Beck et al. | 705/75 |
| 2002/0182578 | A1 * | 12/2002 | Rachman et al. | 434/350 |
| 2003/0074324 | A1 * | 4/2003 | Kresina et al. | 705/60 |
| 2004/0039714 | A1 * | 2/2004 | Meyer et al. | 705/408 |
| 2004/0177050 | A1 * | 9/2004 | Athens et al. | 705/408 |
| 2005/0065892 | A1 * | 3/2005 | Ryan et al. | 705/62 |
| 2005/0138469 | A1 * | 6/2005 | Ryan et al. | 714/20 |

FOREIGN PATENT DOCUMENTS

| | | | |
|---|---|---|---|
| WO | WO 01/35346 | A2 | 5/2004 |
| WO | WO 2005/029265 | A2 | 3/2005 |
| WO | WO-2006/032331 | A2 * | 3/2006 |

* cited by examiner

METHOD FOR PRODUCING A LABEL, COMPUTER PROGRAM PRODUCT, NETWORK NODE AND SYSTEM FOR CARRYING OUT THE METHOD

CROSS REFERENCE TO RELATED APPLICATIONS

Pursuant to 35 U.S.C. §371, this application is the United States National Stage Application of International Patent Application No. PCT/EP2007/009183, filed on Oct. 23, 2007, the contents of which are incorporated by reference as if set forth in their entirety herein, which claims priority to European (EP) Patent Application No. 06022477.1, filed Oct. 27, 2006, the contents of which are incorporated by reference as if set forth in their entirety herein.

BACKGROUND

It is a known procedure to provide mailpieces with labels. Such labels are produced, for example, by a suitable data processing unit such as, for example, a personal computer.

SUMMARY OF THE INVENTION

It is desirable to incorporate, if possible, automatically, information into the label that is relevant for the shipment of the mailpiece.

An exemplary embodiment of the present invention may carry out a method for producing a label that can be applied onto a mailpiece and may configure a system for producing a label that can be applied onto a mailpiece in such a way that a high level of operating convenience for a user is associated with a high degree of protection against manipulation.

Thus, a method for the production of a label according to an exemplary embodiment of the present invention is carried out in such a way that a network node provides a data service that is performed in at least one provider server of a service provider, whereby data is generated for incorporation into the label.

A refinement of the method, of the computer program product, of the network node and of the system according to an exemplary embodiment of the present invention is characterized in that the data service is an Internet service.

It is especially advantageous to use the method, the computer program product, the network node and/or the system according to an exemplary embodiment of the present invention for producing return labels.

As used herein, return labels comprise labels that allow users of the computer system to return to a sender mailpieces they have received.

refinement of the method, of the computer program product, of the network node and of the system according to an exemplary embodiment of the present invention is characterized in that a checking step is carried out in order to check a voucher, and the production of the label is influenced as a function of the result of the checking step.

A refinement of the method, of the computer program product, of the network node and of the system according to an exemplary embodiment of the present invention is characterized in that, in a process step that precedes the checking step, the voucher is transmitted to a user.

A refinement of the method, of the computer program product, of the network node and of the system is characterized in that a program module according to an exemplary embodiment of the present invention is incorporated into the intelligent document, said program module being configured to create displayable information indicating the result of the checking step or of an additional checking step in order to check whether the precondition has been met within the intelligent document.

A refinement of the method, of the computer program product, of the network node and of the system according to an exemplary embodiment of the present invention is characterized in that at least one of the checking steps is carried out by the program module.

A refinement of the method, of the computer program product, of the network node and of the system according to an exemplary embodiment of the present invention is characterized in that, during the checking step, it is checked whether the program execution environment is available.

A refinement of the method, of the computer program product, of the network node and of the system according to an exemplary embodiment of the present invention is characterized in that a program controls the one-time printing of the label, and in that an intelligent document is transmitted from a server via a network to a client.

A refinement of the method, of the computer program product, of the network node and of the system according to an exemplary embodiment of the present invention is characterized in that, when the label is printed for the first time, a message is transmitted from the user client to the server and in that, on the basis of this message, the printing is logged in the server.

A refinement of the method, of the computer program product, of the network node and of the system according to an exemplary embodiment of the present invention is characterized in that the program for controlling the printing of the label can only be executed if a network connection exists between the client and the server, and if, on the basis of a query to the server, it has been ascertained that that label had not been printed before.

A refinement of the method, of the computer program product, of the network node and of the system according to an exemplary embodiment of the present invention is characterized in that, in at least one of the checking steps, it is ascertained whether access to the network exists.

A refinement of the method, of the computer program product, of the network node and of the system according to an exemplary embodiment of the present invention is characterized in that, in at least one of the checking steps, a query to the server is made in which it is checked whether contents of the intelligent document have already been printed before.

An exemplary embodiment of the present invention comprises a system that allows customers to request and print labels via an online interface by a PC, and the latter will be referred to below as the user client. The interface may be provided by a server that is referred to below as the POP server (POP: Parcel Online Postage).

In order to create the labels, the customer first generates one or more entries for mailpieces that are to be sent and places them into a shopping cart on a first page (referred to below as NOW1) provided by the POP server. For this purpose, the NOW1 web page has a button by which the user can access another Internet page (referred to below as NOW2, which shows shipping details) where data about a shipment can be recorded and manipulated.

The data includes, for example, the sender address, the recipient address and a selection of the products and services as well as of the destination countries, said data yielding especially the amount of postage needed for the shipment. Moreover, the user can select one or more additional services for the shipments. These include, for example, a roll service for round shipments or a specific bulk goods service, whereby these variants merely serve as an example of other additional services.

Once the shopping cart contains at least one item, another button becomes active on the NOW1 web page, by which the customer can initiate a payment procedure. This is done by an online payment modality, whereby in particular, the customer can choose among various online payment modalities, including, for example, the payment service PayPal or a credit card payment, said payment procedures merely serving as examples.

After the customer has paid for the purchases in the shopping cart, he or she reaches a page (referred to below as NOW3) that contains links to PDF documents and that allows the printing of the purchased franking labels. Furthermore, after the payment has been made, customers receive an e-mail containing a link to the NOW3 web page by which the web page can be accessed once again at a later point in time as well. The e-mail is sent to an address that the customer had previously entered on the NOW1 web page. If the value of the shopping cart exceeds a certain amount, then the access to the NOW3 web page via the link contained in the e-mail is secured by a PIN that is offered to the user on the NOW3 page, but not transmitted by e-mail.

A refinement of an exemplary embodiment of the present invention comprises a voucher functionality that allows the customer to purchase vouchers and to use them to pay for postage indicia. The vouchers can be added to the shopping cart on the NOW1 web page. Via an appropriate button on this page, the user reaches another page (NOW2—voucher details) where voucher sets can be added to the shopping cart for a basic product that is likewise selected on this page. After the user has paid for the purchases in the shopping cart, the possibility to display or store the purchased voucher code is offered to the user on the NOW3 web page. In order to later redeem the voucher, the customer enters the voucher code on the NOW1 web page when he or she generates the shopping cart.

An exemplary embodiment of the present invention is suitable for creating various types of labels, especially for producing labels to control logistical functions of the mailpieces, especially their transportation, sorting and/or forwarding. In this context, the labels contain, for example, monetary information as proof-of-payment, so that these can be, for example, franking labels.

However, it is likewise possible for the labels to contain additional information for handling the mailpieces—for example, a sender address, a recipient address, a shipping identification code or other data that describes the shipment (e.g. weight or dimensions). As a result, the labels can be used to monitor the shipping progress (tracking) or to confirm the shipping progress (tracing).

In a preferred embodiment, the labels contain not only the addresses of the sender and of the recipient but also a routing code associated with the recipient address, said code being used for the production of the mailpieces in a parcel or mail center of a shipping service provider.

In an especially preferred exemplary embodiment, the label contains an unambiguous label identification code. On the basis of the label identification code, instances of fraudulent use can be ascertained in which a franking label is used multiple times for the franking of mailpieces. For this purpose, the label identification codes of the issued franking labels are stored in a payment assurance system. When a mailpiece is produced, the label identification code is marked in the payment assurance system as having been used. Moreover, for each produced mailpiece, it is checked whether the label identification code has been marked as invalid. If this is the case, this constitutes an instance of fraudulent use. The routing code and the label identification code are inserted into the label in plain text as well as in the form of a barcode. The franking labels are provided to the customer on the basis of intelligent PDF documents.

An exemplary embodiment of the present invention comprises various facilities for creating and printing the label. Various exemplary embodiments are listed below:

After the customer has paid for the purchases in the shopping cart, the POP server receives a notification from the payment service provider about the completed payment transaction. Then a data record for the franking label purchased by the customer is generated in a document database. This data record contains especially an unambiguous document identification code for the intelligent PDF document, information indicating whether the label has already been printed with valid codes, and it also contains form data. The form data comprises the sender and recipient addresses of the mailpieces that are to be franked, and the routing code. Moreover, the form data includes the label identification code that, after the payment, is taken from a pool of previously generated codes. This code is also transmitted to the payment assurance system. Moreover, an intelligent PDF document is created which is a blank form with form fields for the above-mentioned form data. The document identification code serves to identify the PDF document.

The label is printed within the scope of the iPDF mechanism on the basis of a communication between the user client and the POP server or a license server that is associated with the POP server and that can access the document database. The SOAP interface of Acrobat Reader may be used for the communication with the user client. After the PDF document has been opened, first of all, a consecutive checking procedure checks whether an Internet connection is present, whether the document identification code is valid and whether the label has not already been printed before. In order to carry out the latter two checking steps, a service of the POP server is called via the SOAP interface of Acrobat Reader and, after an appropriate query to the database, said service reports back whether a data record for the document identification code is present in the document database, and whether the postage indicium is marked as already having been printed before.

After the checking steps have been successfully executed, the form data stored in the database—except for the valid codes—is downloaded from the POP server via the interface of Acrobat Reader and inserted into the form fields of the PDF document. Instead of the valid codes, the PDF document initially contains only dummy codes so as to prevent the user from being able to make a copy of a valid label. Moreover, the content of the document is first clearly marked as a sample. For the printing, the PDF document provides its own functionality with which test print-outs as well as the printing of a valid label—referred to web as the postage print-out—can be executed using appropriate buttons within the document. In the case of a test print-out, the sample of the label that is at first contained in the PDF document is printed with the dummy codes. In the case of a postage print-out, the valid label is printed, whereby the valid barcodes are called from the POP server after the appropriate button has been actuated. Moreover, on the basis of the actuation of the button for the postage print-out, it is entered in the document database of the POP server that the valid label has been printed and the button becomes pale or is switched to non-active status.

When the document is opened once again after a postage print-out, it is ascertained on the basis of the initially executed checking steps that the label has already been printed out before. In this case, at least one postage print-out is no longer permitted.

The label can have different appearances. It is preferably configured in such a manner that it allows an identification and/or control of mailpieces and, if applicable, also the coordination of a warehousing location.

Advantageously, the labels are scratch-resistant and impact-resistant as well as temperature-resistant.

Examples of such labels are:

barcode labels,
Electronic Article Surveillance (EAS) labels,
labels for merchandise tracking,
intelligent labels,
inventory labels,
pallet labels,
security labels,
thermo labels,
thermo-transfer labels,
transponder labels.

Encoded information may be inserted into the labels as control instruments for parcel logistics.

In particular, the labels can contain consecutive numbering—optionally with a checksum—other types of numbering or address information, or other information that serves to classify the shipment or serves, for example, for advertising purposes.

Especially extensive data volumes can be inserted into SmartLabels.

RFID identification systems—such as "SmartLabels"—allow an optimization of the logistical processes.

Hence, they are suitable for influencing—including controlling—flexible distribution systems for the route-optimized delivery of the mailpieces.

The labels are preferably transmitted to the operating unit in the form of an intelligent document.

In a refinement of an exemplary embodiment of the present invention, an intelligent document is used comprising a program which, when a precondition has been met, can be executed in a program execution environment, said intelligent document containing contents that can be displayed by a display program. The intelligent document may be characterized in that it contains a program module that is configured to create displayable information indicating the result of the checking step in order to check whether the precondition has been met within the intelligent document.

Another refinement of the method, of the intelligent document and of the device according to an exemplary embodiment of the present invention provides that the program execution environment is a component of the display program.

After the purchase of an article by a buyer—for example, at the end of an auction or in the form of a purchase at a fixed price, e.g. from a mail-order company—the process of transacting the shipment begins for the seller, and this process is optimized by an exemplary embodiment of the present invention. As an alternative, also independently of an above-mentioned business instance, a label can be produced that serves, for example, for private purposes or that has the goal of generating a postage indicium with the aim of using it to return one or more articles to a sender.

Preferably, the shipping and/or franking-relevant data is transferred automatically by the shipping information system or by the listing tools—that is to say, without any further action on the part of the seller—to a means for producing a label (label production service).

It is especially advantageous to use an exemplary embodiment of the present invention in systems for producing labels or other print-outs that are to be applied onto mailpieces or other goods to be transported.

A label is preferably a graphic representation—for example, a print-out or a screen image of an intelligent document.

A refinement of an exemplary embodiment of the present invention comprises a method for producing an intelligent document consisting of a program which, when a precondition has been met, can be executed in a program execution environment and that contains contents that can be displayed by a display program.

A preferred exemplary embodiment of the invention may be characterized in that the displayable contents consist of static contents and dynamic contents, whereby the incorporation of the dynamic contents into the intelligent document is carried out separately from the incorporation of the static contents.

In this case, it is especially advantageous for address data and/or franking-relevant data to be examples of dynamic contents as set forth in preferred exemplary embodiments of the invention.

However, a refinement of an exemplary embodiment of the present invention may also be suited for the use of other dynamic information and in other technical contexts, for example, for the automation of other logistics procedures, of production procedures and of the creation and processing of information. Especially advantageous areas of application are those in which dynamic information is displayed and/or processed in a static frame.

The static information comprises information that especially allows the embedding of data.

As used herein, the term "frame" refers to a partial area of a graphic display, especially of a screen page, for example, a graphic user interface. An individual segment may be referred to as a frame, and the definition of all of the frames is called a frameset.

The use of frames allows the parallel display of several individual documents that optionally can be moved independently of each other. Contents from different sources or from different data sources can be combined with each other via the frames.

Moreover, inline frames (IFrames) can be used. They allow an especially simple integration of data into a displayed screen page.

Accordingly, a method according to an exemplary embodiment of the present invention is put forward in which the intelligent document comprises a program which, when a precondition has been met, can be executed in a program execution environment and that contains contents that can be displayed by a display program.

A method according to an exemplary embodiment of the present invention, may be carried out in such a way that two different types of contents that can come from one or more sources are inserted into the intelligent document.

A first type of contents are static contents. Static contents preferably match among multiple documents.

The static contents are preferably contents that are suitable for creating multiple documents. The creation of multiple documents is very advantageous but not necessary.

The static contents may comprise, for example, frame information for creating documents or other information that is updated less often than with the dynamic contents, preferably only when a predefinable time interval expires or when an event is reached. As an alternative, it is possible to leave the static data completely unchanged.

Moreover, an intelligent document according to an exemplary embodiment of the present invention may be created comprising a program which, when a precondition has been met, can be executed in a program execution environment, said intelligent document containing contents that can be displayed by a display program. The intelligent document may be characterized in that it contains a program module that is configured to create displayable information indicating the result of the checking step in order to check whether the precondition has been met within the intelligent document.

In an exemplary embodiment of the present invention, the program module is a component of the static contents.

A refinement of an exemplary embodiment of the present invention may be characterized in that the program module is a component of the dynamic contents.

An especially preferred exemplary embodiment of the invention provides that the program module may be either a component of the dynamic contents or of the static contents.

Moreover, a device for creating an intelligent document according to an exemplary embodiment of the present invention is put forward comprising a program which, when a precondition has been met, can be executed in a program execution environment and that contains contents that can be displayed by a display program. The device may be configured to insert a program module into the intelligent document, said program module being configured to create displayable information indicating the result of the checking step in order to check whether the precondition has been met within the intelligent document.

A refinement of the method, of the intelligent document, of the computer program product and of the device according to an exemplary embodiment of the present invention provides that the intelligent document itself contains a program module with which information indicating the result of a checking step can be created. In this manner, the intelligent document itself is capable of providing information indicating the result of a checking step, so that the result of the checking step is displayed irrespective of the configuration of the display program.

Displayable information within an intelligent document may comprise information that can be displayed, for example, on a monitor by the display program. The intelligent documents can contain not only displayable contents but also additional contents such as, for example, program codes that, at least in a normal display mode, are not shown by a display program.

The method for creating an intelligent document according to an exemplary embodiment of the present invention can be refined in various ways, said intelligent document comprising a program which, when a precondition has been met, can be executed in a program execution environment, and said intelligent document containing contents that can be displayed by a display program.

A refinement of the method, of the intelligent document and of the device according to an exemplary embodiment of the present invention provides that the static contents are transmitted by a server via a network to the client.

A refinement of the method, of the intelligent document and of the device according to an exemplary embodiment of the present invention provides that the dynamic contents are transmitted by a server via a network to the client.

This allows documents to be created especially quickly.

A transmission of the dynamic contents that takes place irrespective of whether the static contents have been transmitted or not has the advantage that the data transmission resources needed for the creation of an intelligent document are reduced.

This advantage is even more pronounced if multiple intelligent documents are being created.

If multiple intelligent documents are being created, it is advantageous to transmit the static contents once and to combine them with different dynamic contents to form different intelligent documents.

Thus, it is possible to use static contents that were created once in order to create multiple intelligent documents that differ from each other.

A refinement of the method, of the intelligent document, of the computer program product and of the device according to an exemplary embodiment of the present invention provides that the static contents and the dynamic contents are transmitted separately from each other.

A refinement of the method, of the intelligent document, of the computer program product and of the device according to an exemplary embodiment of the present invention provides that the transmission takes place at different times.

A refinement of the method, of the intelligent document, of the computer program product and of the device according to an exemplary embodiment of the present invention may be characterized in that the transmission takes place via different transmission routes.

A refinement of the method, of the intelligent document, of the computer program product and of the device according to an exemplary embodiment of the present invention provides that the static contents are made available by a data source that is different from that for the dynamic contents.

A refinement of the method, of the intelligent document, of the computer program product and of the device according to an exemplary embodiment of the present invention may be characterized in that the static contents are transmitted by a first server and in that the dynamic contents are transmitted by another server.

A refinement of the method, of the intelligent document, of the computer program product and of the device according to an exemplary embodiment of the present invention provides that the static data is stored in an area of a client.

This has the advantage that the static data is available in an especially simple and advantageous manner for purposes of creating multiple—preferably different—intelligent documents.

The documents are utilized especially by a client. The client is advantageously available to a user of the system and is thus also referred to in the present application as a user client.

The client is preferably configured in such a way that it recognizes if the transmitted document is an intelligent document. In a refinement of the invention, this takes place in that the presence of confirmation information is checked. This confirmation information is, for example, a signature.

A refinement of the method, of the intelligent document, of the computer program product and of the device according to an exemplary embodiment of the present invention provides that, when a document is opened, the client checks whether it has been signed.

In a refinement of an exemplary embodiment of the present invention, it is checked—preferably in another checking step—whether the signature with which the document was signed is valid.

The static contents are preferably transmitted separately from the dynamic contents. The static contents are, for example, layout information about the design of the document.

Refinements of an exemplary embodiment of the present invention provide for processing the static contents partially, predominantly or completely differently from the way the dynamic contents are processed.

For example, the static contents differ from the dynamic contents in terms of the point in time at which they were created.

Moreover, the static contents and the dynamic contents can also differ from each other in terms of the event that triggered them.

A refinement of the method, of the intelligent document, of the computer program product and of the device according to an exemplary embodiment of the present invention provides that the static contents are transmitted when a first event has occurred.

A refinement of the method, of the intelligent document, of the computer program product and of the device according to an exemplary embodiment of the present invention may be characterized in that the static information is transmitted when an event of a first type of event has occurred.

A refinement of the method, of the intelligent document, of the computer program product and of the device according to an exemplary embodiment of the present invention provides that the dynamic contents are transmitted when a second event has occurred.

A refinement of the method, of the intelligent document, of the computer program product and of the device according to an exemplary embodiment of the present invention may be characterized in that the dynamic information is transmitted when an event of a second type of event has occurred.

A refinement of the method, of the intelligent document, of the computer program product and of the device according to an exemplary embodiment of the present invention provides that the occurrence of the second event is ascertained, within the scope of a checking step.

A refinement of the method, of the intelligent document, of the computer program product and of the device according to an exemplary embodiment of the present invention may be characterized in that the first event differs from the second event.

A refinement of the method, of the intelligent document, of the computer program product and of the device according to an exemplary embodiment of the present invention provides that the first type of event differs from the second type of event.

Moreover, an intelligent document is created according to an exemplary embodiment of the present invention comprising a program which, when a precondition has been met, can be executed in a program execution environment and that contains contents that can be displayed by a display program. The intelligent document is characterized in that it contains a program module that is configured to create displayable information indicating a result of the checking step in order to check whether the precondition has been met within the intelligent document.

Moreover, a device for creating an intelligent document is put forward comprising a program which, when a precondition has been met, can be executed in a program execution environment and that contains contents that can be displayed by a display program. The device may be configured to insert a program module into the intelligent document, said program module being configured to create displayable information indicating the result of the checking step in order to check whether the precondition has been met within the intelligent document.

A refinement an exemplary embodiment of the present invention relates to the fact that the intelligent document itself may contain a program module with which information indicating the result of a checking step can be created. Consequently, the intelligent document itself may be capable of providing information indicating the result of a checking step, so that the result of the checking step is displayed irrespective of the configuration of the display program.

Displayable information within an intelligent document may comprise information that can be displayed, for example, on a monitor, by the display program. Intelligent documents can contain not only displayable contents but also additional contents such as, for example, program codes that, at least in a normal display mode, are not displayed by a display program.

Within the scope of the checking steps, it is advantageously checked whether certain preconditions have been met for the use of the functionality of the intelligent document. If these preconditions have been met, a positive result of the checking step is displayed. If the preconditions have not been met, a negative checking result is displayed, so that the user is informed as to which precondition has not been met. He or she can use this knowledge to meet the precondition in question.

In a method, an intelligent document and a device according to an exemplary embodiment of the present invention, it may be provided that the checking step is carried out by the program module.

Advantageously, the program module in this embodiment may also be configured to execute the checking step, so that the intelligent document can check itself, irrespective of the specific configuration of the display program.

A refinement of the method, of the intelligent document and of the device according to an exemplary embodiment of the present invention may be characterized in that, during the checking step, it is checked whether the program execution environment is available.

This refinement has the advantage that it entails checking whether the program execution environment is available so that, if applicable, the user can be informed that the program execution environment is not present and thus that certain functions of the intelligent document are not available.

If the program execution environment is not available, however, the checking step cannot be performed directly by the execution of a program. By the same token, the information indicating a negative result of the checking step cannot be inserted into the intelligent document by the program module.

Consequently, a method according to an exemplary embodiment of the present invention may relate to the fact that displayable information indicating a negative result of the checking step is inserted into the intelligent document, and that the program module is configured to convert the information indicating the negative result of the checking step into displayable information indicating a positive result of the checking step.

Moreover, an exemplary embodiment of the intelligent document provides that the intelligent document contains displayable information indicating a negative result of the checking step and that said information can be converted by the program module into displayable information indicating a positive result of the checking step.

Furthermore, an exemplary embodiment of the device may be characterized in that the device is configured to insert displayable information indicating a negative result of the checking step into the intelligent document, and in that the program module is configured to convert the displayable information indicating the negative result of the checking step into information indicating a positive result of the checking step.

In this exemplary embodiment, the checking as to whether the program execution environment is present, can advantageously be carried out implicitly by the program module, which creates the information indicating the result of the checking step within the intelligent document. This is achieved in that, through the execution of the program module, which can only occur if the program execution environment is available, information indicating a positive result of the checking step may be created by converting information indicating a negative result of the checking step already present in the intelligent document. If the program execution environment is not available, the program module cannot be executed and the information indicating the negative result of the checking step is retained.

In a refinement of the method, of the intelligent document and of the device according to an exemplary embodiment of the present invention, it is provided that the program controls the one-time printing of a postage indicium and that the intelligent document is transmitted by a server via a network to a client.

A refinement of the method, of the intelligent document and of the device according to an exemplary embodiment of the present invention may also by characterized in that, when the postage indicium is printed for the first time, a message is transmitted from the client to the server and in that, on the basis of this message, the printing is logged in the server.

Moreover, in a refinement of the method, of the intelligent document and of the device according to an exemplary embodiment of the present invention, it is provided that the program for controlling the printing of the postage indicium can only be executed when a network connection exists between the client and the server, and when, on the basis of a query to the server, it is ascertained that that postage indicium had not been printed before.

This prevents a postage indicium that has been paid for once from being printed out multiple times.

A refinement of the method, of the intelligent document and of the device according to an exemplary embodiment of the present invention may be characterized in that, during the checking step, it is checked whether there is access to the network.

Moreover, a refinement of the method, of the intelligent document and of the device according to an exemplary embodiment of the present invention entails the fact that, during the checking step, a query to the server is made in which it is checked whether contents of the intelligent document have already been printed before.

Another refinement of the method, of the intelligent document and of the device according to an exemplary embodiment of the present invention relates to the fact that the program execution environment may be a component of the display program.

Moreover, a computer program product according to an exemplary embodiment of the present invention is provided that contains a computer program for executing a method of the type described above.

Advantages, special features and practical refinements of exemplary embodiments of the present invention are described below making reference to the figures.

DETAILED DESCRIPTION OF SPECIFIC EMBODIMENTS

An exemplary embodiment of the present invention relates to a method for producing a label that can be applied onto a mailpiece. Exemplary embodiments of the present invention may also relate to a computer program product, to a network node and to a device for carrying out the method.

An exemplary embodiment of the present invention comprises numerous possibilities for producing a label that can be applied onto a mailpiece. By applying a label onto a mailpiece, the method for producing a label that can be applied onto a mailpiece is refined into a method for producing the actual mailpiece.

If data contained in the label contains information that is relevant for the shipment, for example, for payment assurance, shipment tracking or forwarding, then an exemplary embodiment of the present invention may also comprise a method and a system for the transportation of mailpieces.

Especially preferred exemplary embodiments of the invention are presented below, in which a simple and reliable incorporation of contents into the labels is associated with an especially great benefit for the transportation of mailpieces.

In the production of the labels, it is especially advantageous to incorporate dynamic contents as well as static contents into the labels.

The static contents are, for example, frame information. This frame information preferably forms a frame that can be displayed graphically.

Dynamic contents can be incorporated into this frame.

It is advantageous for the dynamic contents to be transmitted when an event has occurred—for example, when a checking step has been executed.

According to the invention, various solutions for taking over dynamic contents are provided.

Thus, for example, it is possible to transmit dynamic contents immediately before a display on the screen and/or before a printing procedure.

This can be done, for example, in one of the following ways:

by a text file (csv), by direct transmission from a database or via SOAP calls.

Figure 1:
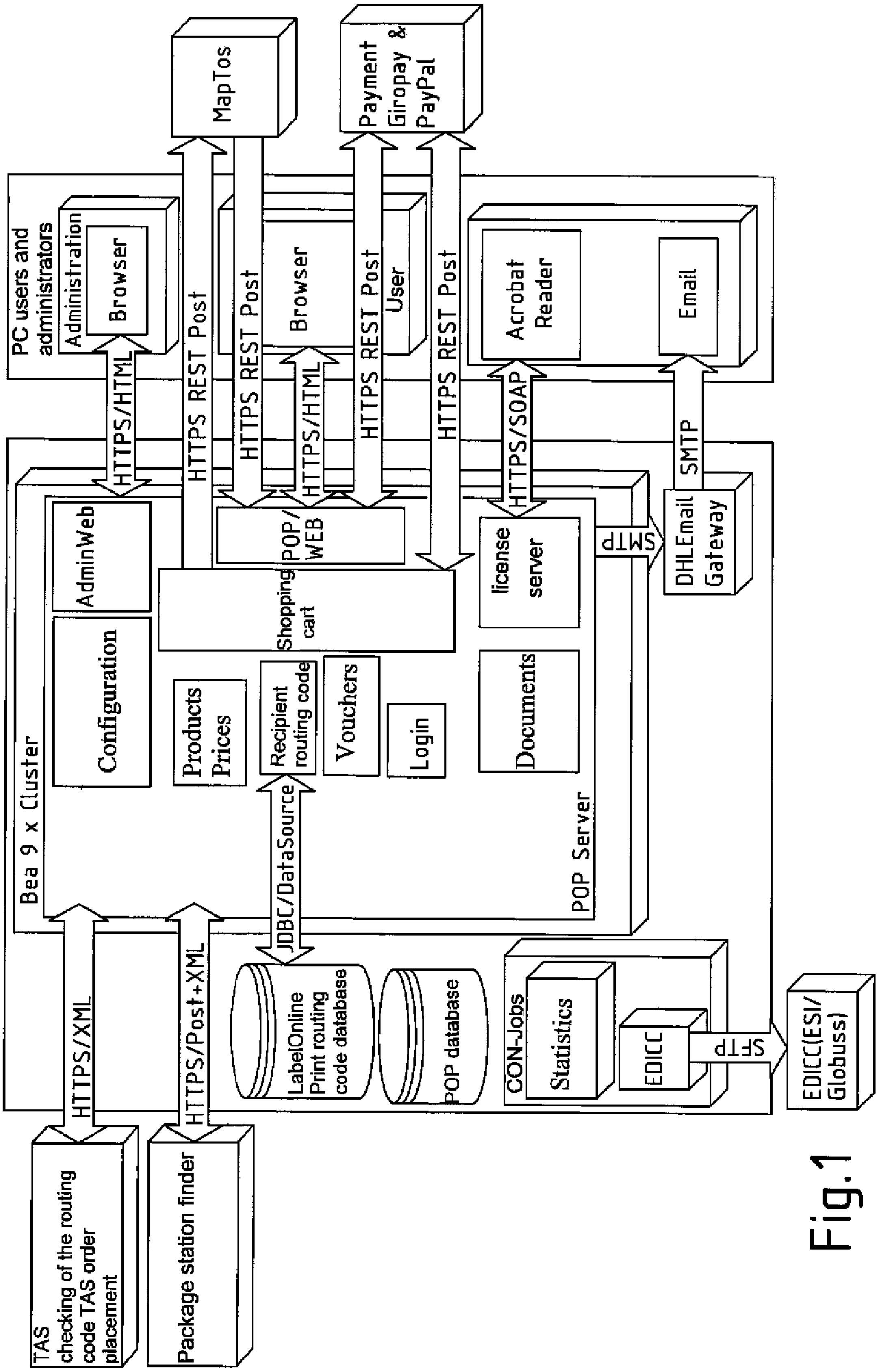
FIG. 1 is a block diagram of a user client that is connected to a server from which intelligent documents can be transmitted to the user client according to an exemplary embodiment of the present invention.

FIG. 1 schematically shows a server.

The server is connected to a user client (user system) via a network. The network is, for example, the Internet or an intranet.

Intelligent documents are transmitted from the server via the network to a user client. For this purpose, the server has a means configured, for example, as a software program, in order to create intelligent documents.

In an exemplary embodiment of the present invention, the server is configured as a server that provides intelligent documents for the printing of labels. In this embodiment, the server comprises a database with one entry for each label that has been generated and transmitted to a user client.

The presented server is connected to a client via a network. The network is, for example, the Internet or an intranet. The client is, for example, a PC (personal computer).

The use of a personal computer is only to be understood as an example. This term refers to any data processing unit that can execute processing operations. In particular, this includes systems that can work with operating systems that differ from each other. For example, it is possible to use the Windows, Mac or Linux operating systems.

In particular, the client (user client) is a computer that is connected via the Internet. In order to enhance data security, the connection to the server is made especially via https (hyper text transfer protocol) with encrypted transmission. This makes "Man in the Middle" attacks more difficult.

It is advantageous to additionally provide SOAP calls with their own signature and to only process information if each applied signature has been recognized as being valid.

This information is, for example, data that was created with XML "Extended Markup Language".

It is advantageous to carry out the data exchange using SOAP (Simple Object Access Protocol).

In a preferred embodiment, the data is transmitted to the client by a download.

For example, an Adobe Reader, version 6.0.2, a more recent version of this program or Adobe Professional Software is installed on the client. Contents are opened via PDFs, by Adobe Reader and subsequently, the dynamic contents (especially user-specific data) are loaded by SOAP call into the main memory of the application Adobe Reader and then sent by a print job to a printer, together with the static data.

Advantageously, the client is configured in such a way that it has a display device and at least one input device as well as a memory and a processor. In particular, a display program is stored in the memory; this program can be executed in the client and it can open conventional documents having a certain format such as, for example, PDF documents, and can display their contents on the display device. Moreover, the display program allows the processing of intelligent documents, that is to say, it is configured to display displayable contents of intelligent documents on the display device, and to execute programs that are contained in the intelligent documents. For this purpose, the display program provides a program execution environment with which program commands contained in the programs can be interpreted and executed. Moreover, the client is connected to a printing device via an interface and it has a network interface for purposes of connecting to the network.

Intelligent documents are transmitted from the server via the network to the client. For this purpose, the server has a means configured, for example, as a software program, in order to create intelligent documents. In an embodiment, the server is configured as a server that provides intelligent documents for the printing of postage indicia. In this embodiment, the server comprises a database with one entry for each postage indicium that has been generated and transmitted to a client.

The intelligent documents comprise contents that can be displayed on the display device by the display program and that consist of text elements and/or graphic elements. Furthermore, programs that can be executed by the program execution environment are embedded into the intelligent documents. These programs are scripts comprising the program code that can be interpreted by the program execution environment. Displayable contents of the intelligent documents can be changed by the programs. Moreover, the programs allow the execution of additional processes such as, for example, the actuation of the printing device for printing contents of the intelligent document or access to the network interface. In the normal display mode of the display program, the program code is not displayed on the display device. Fundamentally, however, the display program can have a special display mode in which the program code can also be displayed.

An intelligent document provided by the server according to an exemplary embodiment of the present invention may also contain status information indicating the result of one or more checking steps. Here, displayable information indicating the checking results is created by one or more program modules that are likewise contained in the intelligent document. The program modules can be configured as autonomous programs or they can be part of a program that is provided for the execution of the main functionality of the intelligent document. Within the scope of the checking steps, it is ascertained whether certain preconditions for the use of the main functionalities of the intelligent document have been met. In this manner, in the eventuality of an unusable functionality, the user especially is informed about a precondition that might not have been met. He or she can use this knowledge to meet the precondition and thus to use the functionalities of the intelligent document.

A precondition for the use of the functionality of an intelligent document is the availability of the program execution environment. As a rule, however, not all display programs for displaying documents in the format of the intelligent document have a suitable program execution environment. Thus, the program execution environment might not be present, for example, in older versions of the display program. Therefore, in an embodiment, a checking step especially checks whether the display program of the client has a program execution environment that is suitable for executing the program contained in the intelligent document. In order to be able to correctly display the result of this checking step even if the program execution environment is not present, displayable information indicating a negative result of the checking step is already inserted into the document at the time when the intelligent document is created. Furthermore, a program module is inserted into the intelligent document and this program module—when it is executed—converts information indicating the negative result of the checking step into information indicating a successful execution of the checking step. The intelligent document is preferably configured in such a way that, after said intelligent document has been opened in the display program, the program module is automatically started if the program execution environment is present.

Checking whether the program execution environment is available is preferably carried out implicitly and this yields a positive or negative result, depending on whether the program module can be executed or not.

In addition to this checking step, in which a decision is made about the presence of the program execution environment, by the same token, other checking steps can be executed by a program contained in the intelligent document. The results of these checking steps can then be displayed in the same manner in that, by a program module, information indicating a negative result is converted into information indicating a positive result.

The conversion of the information indicating the negative result of the checking step into the display of a positive result of the checking step can be done by changing the information. For example, one or more characters can be added to the negative information in order to create information indicating a positive result of the checking step. Moreover, the status information can be configured, for example, to be colored. The information indicating the negative result of the checking step can be converted into information indicating a positive result by a color change that is effectuated by the program. Furthermore, it can also be provided that characters or symbols of the information indicating the negative result of the checking result are at least partially replaced by characters or symbols by which a positive result of the checking step is displayed. The checking result can be displayed visibly for the user or it can remain invisible.

The intelligent documents comprise contents that can be displayed on a display by the display program and that consist of text elements and/or graphic elements. Moreover, programs are embedded in the intelligent documents that can be executed by the program execution environment of the display program.

The programs are, for example, scripts comprising the program code that can be interpreted by the program execution environment. Displayable contents of the intelligent documents can be changed by the programs. Moreover, the programs allow the execution of additional processes such as, for example, the actuation of a printing device for printing contents of the intelligent document or access to the network interface. In the normal display mode of the display program, the program code is not displayed on the display device. Fundamentally, however, the display program can have a special display mode in which the program code can also be displayed.

An intelligent document provided by the server according to an exemplary embodiment of the present invention may also contain status information indicating the result of one or more checking steps. Here, displayable information indicating the checking results is created by one or more program modules that are likewise contained in the intelligent document. The program modules can be configured as autonomous programs or they can be part of a program that is provided for the execution of the main functionality of the intelligent document. Within the scope of the checking steps, it is ascertained whether certain preconditions for the use of the main functionalities of the intelligent document have been met. In this manner, in the eventuality of an unusable functionality, the user especially is informed about a precondition that might not have been met. He or she can use this knowledge to meet the precondition and thus to use the functionalities of the intelligent document.

A precondition for the use of the functionality of an intelligent document is the availability of the program execution environment. As a rule, however, not all display programs for displaying documents in the format of the intelligent document have a suitable program execution environment. Thus, the program execution environment might not be present, for example, in older versions of the display program. Therefore, in an embodiment, a checking step especially checks whether the display program of the client has a program execution environment that is suitable for executing the program contained in the intelligent document. In order to be able to correctly display the result of this checking step even if the program execution environment is not present, displayable information indicating a negative result of the checking step is already inserted into the document at the time when the intelligent document is created. Furthermore, a program module is inserted into the intelligent document and this program module—when it is executed—converts information indicating the negative result of the checking step into information indicating a successful execution of the checking step. The intelligent document is preferably configured in such a way that, after said intelligent document has been opened in the display program, the program module is automatically started if the program execution environment is present.

Checking whether the program execution environment is available is preferably carried out implicitly and this yields a positive or negative result, depending on whether the program module can be executed or not.

In addition to this checking step, in which a decision is made about the presence of the program execution environment, by the same token, other checking steps can be executed by a program contained in the intelligent document. The results of these checking steps can then be displayed in the same manner in that, by a program module, information indicating a negative result is converted into information indicating a positive result.

The conversion of the information indicating the negative result of the checking step into the display of a positive result of the checking step can be done by changing the information. For example, one or more characters can be added to the negative information in order to create information indicating a positive result of the checking step. Moreover, the status information can be configured, for example, to be colored or it can remain invisible for the user, except in the case when the checking result is negative, in order to thus inform the user about the negative checking result. The information indicating the negative result of the checking step can be converted into information indicating a positive result by a color change that is effectuated by the program. Furthermore, it can also be provided that characters or symbols of the information indicating the negative result of the checking are at least partially replaced by characters or symbols by which a positive result of the checking step is displayed.

The presented steps are preferably carried out using the system shown in FIG. 1.

This system comprises an provider server and a network node (referred to as maptos below).

In the overview, maptos stand for an external entry point into the POP application. Further accesses to the individual web pages of the POP application are, if applicable, transparently effectuated by maptos.

Maptos refer to a network node for providing at least one Internet service that is performed in at least one provider server of a service provider.

A refinement of the network node maptos comprises at least one external connector for receiving a service request whose generation can be initiated in a user computer of an Internet marketplace user, and for transmitting to the user computer a processing result that is ascertained in the provider server, whereby the external connector is capable of carrying out a format change of the service request and of the processing result, said change being adapted to the Internet marketplace.

Moreover, it is advantageous to configure the network node in such way that it has a transformation unit connected to the external connector in order to ascertain at least one provider server so as to execute the service on the basis of information contained in the service request, and so as to address the service request to the ascertained provider server.

A refinement of the network node comprises at least one internal connector that is connected to the transformation unit in order to transmit the service request to the provider server and in order to receive from the provider server the processing result ascertained in the provider server.

As used herein, the term “Internet marketplace” is to be understood in the broadest sense of the word and comprises especially web portals such as, for example, auction portals, online exchanges or discussion forums on the Internet as well as web pages that are provided, for example, by online shops.

With the network node, Internet services provided by a service provider can be offered on an Internet marketplace without a need for the provider servers that perform the Internet services to be adapted to the Internet marketplace. The interpretation of the service request—i.e. especially making necessary format changes, ascertaining the provider server needed to perform the service and addressing the service request to the provider server—all take place in the network node, so that the information needed in order to perform the Internet service can be acquired in a marketplace-specific manner and can be incorporated into the service request without the Internet marketplace already having to effectuate an adaptation to the requirements of the provider server.

Moreover, the interface between the network node and the Internet marketplace is uncoupled from the interface between the network node and the provider server, as a result of which very high degree of flexibility is achieved when it comes to adapting the transformation node.

Thanks to the external connectors, it is advantageously achieved that the network node itself can be adapted simply and flexibly to an Internet marketplace and especially to a data format used in the communication with an Internet marketplace, without the adaptation calling for changes to the inner functionality of the network node, i.e. especially adaptations of the transformation unit.

The POP server runs on several instances, e.g. within a BEA 9.x cluster.

In a preferred exemplary embodiment of the invention, an upstream web server is not necessary if the application generates all of the data (HTML, PDF) dynamically.

Sticky sessions are used to distribute the HTTP requests among the individual instances within the BEA cluster. Sticky sessions ensure that an individual session of a user is always processed by the same cluster node.

For the persistent storage of the data, the POP application uses a shared database for all of the instances, for example, Oracle 9.x or 10.x.

A Java process is provided as a CronJob for the aggregation of logging data for statistics and this Java process accesses the database of the POP server. This process can optionally also periodically delete old logging data.

Another batch job uses the data previously written into the database by the POP server in order to report specific data (referred to as PAN data below) to third-party systems (referred to as EDICC below).

Storing data of the POP server outside of the database in a file system is possible but not necessary. It is advantageous for the EDICC module to create temporary files (/tmp) for the sFTP protocol.

Note:

Batch jobs are protected against parallel, i.e. multiple, starts, in order to prevent undesired side effects from occurring as a result.

Figure 2:
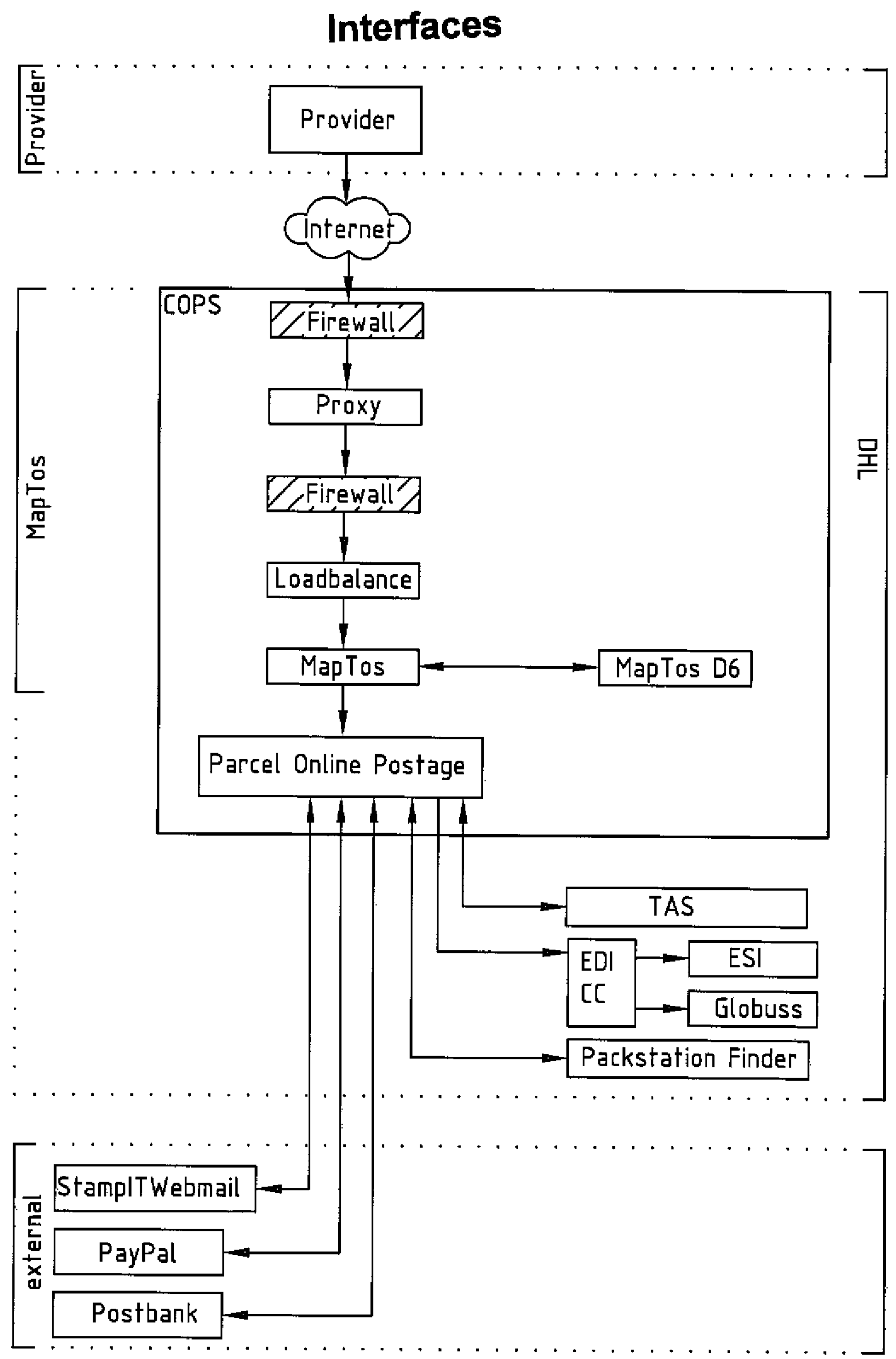
FIG. 2 is a block diagram that is useful in providing an overview of interfaces used according to an exemplary embodiment of the present invention.

FIG. 2 shows an overview of especially advantageous interfaces.

The interfaces serve to establish a connection between a provider server according to an exemplary embodiment of the present invention and a vendor server (referred to as provider). An exemplary embodiment of the present invention is advantageously carried out via the Internet.

The provider server can be connected to a client (user system). The client is, for example, a user system that is equipped in such a way that it can receive data from the server and/or can transmit data to the server. For example, the client is a personal computer, a company network or a mobile user terminal device such as, for instance, a mobile telephone.

Preferably, the client is configured in such a way that it comprises browser functionalities.

These are, for example, a web browser (with an activated Javascript, HTML 4.0), whereby it is advantageous for the application to be configured in such a way that it can be started and used with numerous different browser types. These include, for example, the following browser types:

Internet Explorer Version 6.0,
Mozilla Firefox 1.5,
Netscape 7.1,
Safari 2.0.4 (Mac OS).

The list of the cited browsers can be expanded at any time so that advances can be taken into account.

It is advantageous to introduce security mechanisms to secure the communication between the client and the provider server against unauthorized surreptitious eavesdropping by third parties.

By the same token, it is advantageous to secure the communication between the provider server and other external systems—especially payment systems.

Therefore, it is advantageous to use secure protocols for the communication. These are, for example:

HTTPS (POST, GET, XML),
sFTP (EDICC).

Both protocols are secured against manipulation or surreptitious eavesdropping by third parties.

If the communication is carried out with a company-internal system via an internal network and if the transmitted data does not contain any sensitive data, HTTP can optionally be used instead of HTTPS.

No codes, passwords and the like are contained directly in the sent e-mails, but rather only a link with an ID (preferably different from the transaction ID) is embedded, which leads to an HTML page (NOW3).

Misuse Protection

The numbers generated by the application—vouchers, documents, shopping cart, PIN—are generated in such a way that they cannot be guessed by the user. Moreover, these numbers are stored in the database and in this manner, their "consumption" is controlled.

System Access Data

Access data that is needed for the use of the external interfaces is stored in the database by a symmetrical encryption method (contained in the web application), i.e. this data cannot be seen by a database administrator, either.

Security Protocols of the Payment Platforms

The standard mechanisms are used for securing the communication between the application and the payment platform.

The actual payment procedures are carried out on the web pages of the payment platform so that this transaction is encapsulated for the application.

User-Related Data

Preferably, the provider server only contains data that is practical for the execution of the method. This is, for example:

content of the shopping cart, as long as it is necessary to make the pertinent functions available to the user (PDF documents, for example, 32 days; for voucher codes also longer, whereby, from a technical standpoint, these values can be configured in any desired manner, so that the prescribed setting is only by way of an example).

the purchased label including the necessary data (32 days—see previous point).

e-mail address of the user from the short registration with participation in mailing campaigns (unlimited).

if the shopping cart contains vouchers that have not yet been used up, then the shopping cart with these vouchers is valid for a correspondingly longer period of time (validity of the vouchers).

Data in the database is not deleted but rather marked accordingly, for example, via an attribute.

Above a certain price level, the subsequent access of a user to his or her shopping cart involves the additional input of a PIN or PIN2.

Reconstructability by Logging

All of the important actions of the application as well as the calls by external interfaces are logged in the database. If the logging in the database is not possible, the logging mechanisms of the application server are used.

Configuration Management

The configuration management with the time-related data (e.g. prices, vouchers) and the static resources is set up in such a way that configurations that have been set up and already rendered productive can no longer be removed from the database. Moreover, for each point in time in the past, the configuration data valid at that point in time can be reconstructed.

Interface

The interface of the application that is visible to the user breaks down essentially into the following web pages:

NOW1: display of the entire shopping cart,

NOW2 shipment: detailed display of a shipment,

NOW2 voucher: detailed display of a voucher set,

NOW2 pick-up: detailed display of a pick-up order,

NOW3: information about the shopping cart paid for in the preceding step.

Field Definitions

In order to prevent the page layout from being affected due to the display of excessively long field contents (for example, very long street names), these are either displayed in non-editable text boxes having a fixed length, or they are cut off after a defined number of characters (of course, only for the display).

Input fields are specially marked (edit, input); for the rest, the described fields are purely display fields without any further function. Information that might follow in parentheses such as AN (64) means "maximally 64 alphanumeric characters"; analogously, for instance, N(6) "maximally 6 numeric characters". If no more precise specification is given, this is a one-line input field with free input (no drop-down list or the like). In case of validation errors (wrong format; missing input), the field in question or the area is marked in color.

NOW1: Shopping Cart

This page shows an overview of the shopping cart and of the items contained therein. The user can generate or manipulate items in the shopping cart, and can ultimately initiate the payment.

Accessible from:

NOW0: link to home page

NOW1: reload (for example, display error messages; redeem voucher)

NOW2: return after processing a single list item

The display of a single shipment in the shopping cart consists of the following elements:

icon "exclamation point" in case of erroneous shipment data; in this case, the item is also backlit with another color, sender address, consisting of the lines Name1, Name2, street, house number, postal code, city and country (country, only if not Germany)

recipient address, consisting of the lines Name1, Name2, street, house number, postal code, city and country (country, only if not Germany)

product cell selected product and list of all possible selectable services for the product. The options already selected by the user are marked. If no product has been selected yet, a static text "No product selected" is displayed.

action "Deselect service".

price cell a total price including currency for the entire shipment. If no price can be determined, no price is displayed.

if a voucher has already been redeemed for this shipment, the static text "Voucher redeemed" appears.

alternatively: action: "Redeem voucher" (button "OK") with input field for the voucher number.

action "Remove", action: (item) "Change . . . ". Call by NOW2, optional messages about the shipment that occupy the full width of a shipment.

Item—Pick-Up

This entry appears after all of the shipment items and voucher-set items, and only if a pick-up is booked for the shopping cart. The displayed price is recalculated after each change made to the shopping cart.

The display consists of the following elements:

The "sender" and "recipient" cells remain empty,

"Product" cell: static text "pick up of all shipments",

"Price" cell: the total surcharge for the pick-up; here, the sums are added up per shipment, "Remove item" action cancels a booked pick-up, "Change item" action: call of the popup window.

Item—Discount Information

In this item, information is displayed to the user about a discount that might be granted.

The display consists of the following elements:

In the "sender" and "recipient" cells, a highlighted text placed in the discount line can pop up.

In the "product" cell, the static text "discount" and the name of the applicable discount definition are displayed.

In the "price" cell, the discount amount including the currency is displayed as a negative item.

Action "Remove item" and action "Change item" are eliminated.

Action "Deselect Service"

The user can book individual services under a shipment item. The change becomes active immediately after the selection, i.e. the website is reloaded after each action. If no corresponding product exists for the selected combination, then an error message is displayed. In an especially preferred embodiment, technical methods can also achieve that it is not necessary to completely reload a page in order to reconfigure a price.

Action "Add Additional Shipment . . . "

Direct display of the NOW2 shipment page. The address of the first shipment, if available, is used as the specification for the sender address.

Action "Value Added Tax Breakdown"

Display of the popup.

Action "Why is a Valid E-Mail Address Necessary?"

Display of the popup.

Action "Call up General Terms and Conditions"

Display of the popup.

Action: (Item) "Change"

Call of NOW2 shipment.

Action "Redeem Voucher"

A voucher number serves as the input. The voucher is associated with the shipment in whose line the number was entered. In case of an erroneous code, an error text such as "Invalid voucher code", "Voucher expired" or "Voucher does not match shipment" pops up at the defined place. If no product has been selected for the shipment yet, then this selection is done on the basis of the voucher code.

If a TAS pick-up is also contained in the voucher, then this is automatically booked for the entire shopping cart.

Action "Proceed to Check-Out"

This action is deactivated when the shopping cart is empty, the shipment had erroneous data, the pick-up address cannot be TAS routing-coded.

If errors occur during the payment procedure, then NOW1 is displayed again and an error message in plain text pops up at the defined place. If this is successful, the application jumps to NOW3.

Action "Remove Item"

First of all, the user has to confirm the action ("Are you really sure . . . ?"). If this is answered in the affirmative, the item is removed from the shopping cart. A voucher redeemed for this item is released again.

Action "Book" (Pick-Up)

Via the popup window that now appears, the user enters the pick-up date and the pick-up address. The costs for the TAS pick-up are then displayed under a separate item in the shopping cart.

Action "Select Vouchers"

Calls the NOW2 voucher page.

Optional Messages About a Shipment

The message "No pick-up is possible for this shipment" is displayed if a pick-up has been booked for the shopping cart, but if the product that makes up the shipment cannot be combined with this service.

The message "The recipient address could not be verified", if the recipient address cannot be routing-coded.

Error message "The shipment data is not complete. Please correct your information", if the shipment data is erroneous.

Module NOW1

The dynamic module NOW1 pops up at the lower left of the page.

In an input mask (popup window), the user can employ a dropdown list to enter a pick-up date and a pick-up address. The date list contains n consecutive days in chronological, ascending order. The first day is preselected. Sundays are not offered in the list. Whether the next day is shown in the list is decided upon by a configurable time indication:

If the current system time is still before this time of day, the next day is offered; otherwise, the earliest possible option is the day after that. The total number of entries in the list can be configured as well. The sender address of the first shipment is used as the initial specification for the pick-up address. The window can only be left after it has been "confirmed" whether the pick-up address can be routing-coded. In case of an error, a message is visibly displayed as in the screenshot.

In a refinement of an exemplary embodiment of the present invention, it is likewise possible to book a pick-up for the same day or for a specific time period.

Popup E-Mail Confirmation

When the user wants to pay for the shopping cart, he is prompted by this popup window to confirm the e-mail address that is recorded in the shopping cart. (Exception: if the address is the e-mail address transmitted by maptos). If necessary, the information in this window can be overwritten.

Agreement With the General Terms and Conditions

For each shopping cart, the user has to agree with the general terms and conditions every time by checking the appropriate select box, i.e. the default value is "not set".

Erroneous Shipment Data

Each erroneous shipment is marked with a preceding "!" and has to be corrected or removed by the user before the shopping cart can be paid for.

In a first step, it is checked whether the following mandatory fields have been filled in for the sender address and recipient address:

name, street, postal code, city.

For example, if the name associated with a recipient address for a shipment is empty, then the entire address and thus the shipment is considered to be erroneous.

The procedure is analogous if no product key or an invalid product key has been entered or in case of a booked pick-up, the pick-up address cannot be routing-coded.

Certain functions, which are described in the following paragraph, are additionally dependent on whether the sender address or recipient address can be routing-coded.

Checking the Routing Codes

When the user returns to NOW1, the routing codes of the recipient addresses are determined This process takes place synchronously so that the results can be displayed immediately. The ascertained routing codes or the status address cannot be routing-coded is stored within the user session for each address, so that the number of routing code calls can be minimized for performance reasons.

NOW2: Shipment Details

On this page, the data of a shipment such as addresses and the product can be recorded and manipulated. If the product has not been set, the product that matches the recipient country (highest sorting key value) is preselected.

Accessible from:

NOW 1: action "Add another shipment" (display of NOW2 with specification values)

NOW1: action "Change . . . " (display with the data pertaining to the corresponding shipment)

The sender address and recipient address are recorded in the upper part of the page. For the sender and recipient countries, a drop-down list is offered from which the user can select the country. A free input is not possible but, as a matter of principle, would be conceivable. If no explicit specification for the country is present, then "Germany" is used as the default setting.

The country list is stored in the system.

In the second part, depending on the recipient country, the possible basic products are displayed (normally always "parcel", "10-kg package", "20-kg package", whereby these are merely examples for basic products) of which the user has to select one specific product. If no product has been stored yet for the shipment, then the first entry is automatically selected. When a product is selected, the page is updated and the product price for the selected product and for the current combination of the services is displayed.

In the third part of the page, the services are offered that can be selected for the combination of recipient country and basic product. In the case of a (de-)selection, the page is updated and the current price for the selected services is displayed.

Through a suitable display medium—especially a website—a selection of one, several or all of the following actions is made possible.

Action "Remove Voucher Code"

If a voucher code has been entered for this shipment, it is removed again after a confirmation question ("Are you really sure . . . ?").

Action "Abort"

The changes on the page are discarded and the program returns to NOW1.

Action "Remove Voucher"

This action is only activated if a voucher has already been redeemed for this shipment. After a confirmation question ("Are you really sure . . . ?"), the code is removed from the shipment and the same page is displayed again.

Action "OK" (Confirm Shipment)

On the basis of the selected combination of recipient country, product, services and pick-up status of the shopping cart, it is checked whether a fitting product exists in the product list. If not, the same page is displayed to the user once again with an error message.

If it was possible to find a fitting product, then the shipment is updated and the NOW1 shopping cart page is displayed again.

NOW2: Voucher Details

Using this page, new voucher sets can be placed into the shopping cart. The user first selects a basic product, as a result of which the dropdown list is updated with the voucher definitions that can be obtained for this basic product. If the user selects a new voucher definition, the dropdown list is updated analogously with the various denominations (taking a specification denomination into account).

In addition, in the upper area of the page, a list is displayed with a maximum of three entries. These entries describe the first three of the voucher definitions that are also offered in the dropdown list, together with the standard denomination and the applicable price. For each entry, an action "Buy now!" is offered.

Accessible from:

NOW1: action "Add voucher"

Action "OK"

Places the selected voucher set into the shopping cart and jumps back to NOW 1.

NOW3

This page contains the stamps purchased by the user in the form of links on the PDF documents as well as, if applicable, a list of purchased voucher codes. They are displayed after the payment for the items in the shopping cart has been successfully completed. As an alternative, the user can go back to this page via a link in his or her confirmation e-mail.

Under certain conditions, access to the data of the page is secured through the entry of a PIN or PIN2.

Accessible from:

NOW1: action "Proceed to check-out"

NOW3 login

The text display of the PDF links on the page is compiled in the following manner:

text "label", recipient name1, recipient name2, date in the form of "DD/MM/YYYY", consecutive number, text "PDF".

These fields are shortened to an individual length of 15 characters each and joined by "_". Special characters and umlauts are replaced.

Header for list with the column headings "Printed", "Voucher code" and "Voucher type":
- a "checkmark", if used
- voucher code
- voucher type (abbreviation from the voucher definition)

Box "Receive by e-mail and process at home at your convenience":
- dynamic popup of e-mail address with a notice that the documentation was sent to this address.
- a shopping cart ID with the notice to have this handy in case of questions to customer support.
- the PIN for the shopping cart with another notice, if needed.

Popup with the dynamic module NOW3 (0) at the lower left

Box "Pick-up" (if booked in the shopping cart)
- text "You booked a pick-up of your shopping cart for DD/MM/YYYY" (dynamic date), followed by the pick-up address.

Alternative to the box "pick-up": box "Is there a package station near you?"
- If no, a text is displayed in the box that reads: "Unfortunately, no package station near you could be found."
- If yes, a text is displayed in the box that reads: "Take advantage of the benefits of the package station. You can drop off your shipments at your package station around the clock", followed by a link to the package station finder (external website). The address of the found package station is displayed behind this.

Action: "Close window"

NOW3 Login

The user can also go to the NOW3 page later via a link contained in the e-mail. If the shopping cart exceeds a certain minimum value, this access is secured by the input of a PIN or PIN2 in the NOW3 login mask.

After a valid PIN or PIN2 has been entered, the user is sent to the NOW3 page. In case of an error, a message appears within the same page and the user can once again enter his login data.

Note: if applicable, this additional security for the shopping cart, if applicable, will only be implemented in Phase II.

Modules

As a function of the time and the marketplace, various modules can pop up in a web page. Here, a module describes a rectangular partial section of a web page. The content of the module is static.

In a refinement of the display method, the characteristics of the modules can also be described merely by data conventions, so that the configuration of the modules themselves can be completely carried out by a marketplace.

Possible embodiments of the modules can be:

Portal Module

A module of the POP application can be dynamically loaded onto the web pages of a marketplace operator and can be embedded in their own pages. For example, this module can contain a simple link to the shopping cart page (NOW1) via which a marketplace customer can get to the POP application.

NOW1 Module

This module pops up at the lower left of the NOW1 page. A FAQ module, for example, can be pre-configured here. A click on a question in the module opens a popup window with the FAQ text.

NOW3 Module

On the NOW3 page, another module pops up at the lower left. It can be configured separately from the preceding module but will initially be filled with the identical content.

E-Mail Confirmation

Once the shopping cart of a user has been taken care of, he or she receives a notification by e-mail. This e-mail consists of the following components:

static text, a single link—provided with an unambiguous key—to the NOW3 page; the subsequent association with the shopping cart is established via this link, shopping cart ID for support questions, payment confirmation regarding the shopping cart, analogous to the value added tax popup, if present, a notice including the address of a package station near the first address of the sender of the shipment.

Booking Text

The following information (by way of an example) appears on the account statement of the user:

"Your shopping cart ID: ABCDEFGHKL," (31 characters)

Optional: "Your PIN2: 9999," (17 characters)

"Thank you for using DHL Express" (43 characters)

This yields a total of 101 characters (maximum limit PayPal: 127 characters)

Cue Points into the Application

The POP application can be addressed via maptos, whereby initially, the NOW1 page is displayed. As an alternative, direct access to the NOW3 page—if applicable, with additional login via PIN or PIN2—is possible via the link in the confirmation e-mail.

Services

The following services are permanently integrated into the application (by way of an example):

TAS pick-up roll service,

"green".

The service "TAS pick-up" can only be selected as a whole for the entire shopping cart. Here, the indication of a pick-up date is mandatory. Moreover, in a refinement, in the case of a pick-up of a mailpiece, a period of time can be selected for the pick-up.

With the remaining services, no further data is requested from the user, especially no weights or dimensions.

Services are stored in the database. Simple services (without a special logic) can be subsequently added without programming via database changes. Here, however, it should be noted that dependent data such as, for example, the prices, have to be updated on an as-needed basis.

Service Attributes

A single service is preferably defined by the following attributes.

| Attribute | Description |
|---|---|
| SymbolName | an unambiguous symbolic abbreviation for a service |
| Screenname | name for the display in the interface |
| Description, priced | an abbreviation of the service flag, as to whether a price has to be stored for this service (not, for example, for a TAS pick-up) |

Countries

Products (combinations of basic products and services) can be administered country-specifically. In order not to have to define identical products for each EU country, a special designation "EU" is introduced. Products of several countries can be associated simultaneously on the basis of a country list stored in the system. The classification "EU", however, is only used as long as no product is associated with a "real" country.

Example:

Several products with the country identification "EU" and one single product with the country identification "AT" for Austria are defined in a fictitious country price list. If the "AT" product is removed from the product list, then the algorithm yields all of the products with the country identification "EU".

Addresses

Addresses are stored in the POP application in the following fields:

name1, name2, street, house number, postal code, city, country.

Addresses that are forwarded by maptos do not contain a separate field for the house number. This is split off from the combined street-house number field, analogously to the routing code library of online label print.

Marketplace

In the application, new marketplaces can be defined via the admin-web. The marketplaces are, for example, the presented providers.

Elements such as modules, prices and vouchers can be defined in a marketplace-dependent manner. A marketplace is also always set in the session of the user.

| Attribute | Description |
|---|---|
| Name | Synonym for the marketplace, for example, "PROVIDER", DHL" |
| Currency | The currency valid for this marketplace; in Phase I, always euros |
| Language | Language identification for selecting the correct translation table (Phase II) |
| Payment information | One data record per payment modality that is valid for the marketplace. Also defines the validity of the payment modality for a marketplace. |
| EKP number | For EDICC transmission |
| Minimum amount | Minimum payment amount that can be transacted for this marketplace-payment combination. |
| Maximum amount | Maximum payment amount that can be transacted for this marketplace-payment combination. |
| Minimum amount PIN | Above this amount, the purchase of vouchers is secured by an additional PIN procedure. |

Marketplace Attributes

Positive List

The positive list contains all of the products available in the system. Each line describes a single product. The "left" side (product number, product name, basic product information, country) can appear multiple times. The right sides of the table rows then indicate all of the valid combinations of services that can be associated with this "left side". Each line always includes the basic product itself.

It is advantageous to configure the list in such a way that it applies to all marketplaces. Preferably, the list and the system are harmonized with each other in such a way that combinations that are not contained there are not valid.

The following table describes the columns with which the positive list is constructed.

| Abbreviation | Explanation/content |
|---|---|
| NR | unambiguous number for the product |
| Name | name of the product that is displayed in the interface |
| PCK | basic product parcel |
| PK10 | basic product 10-kg package |
| PK20 | basic product 20-kg package |
| Country | ISO code of a country; as a special case, "EU" possible Services |
| A-TAS | TAS pick-up |
| Roll | roll service |
| Green | "green" |

Column Description of the Positive List

A shortened example of a positive list:

| No. | Product name | PCK | PK10 | PK20 | Country | A-TAS | Roll | Green |
|---|---|---|---|---|---|---|---|---|
| 1 | Parcel (PA) | X | | | D | | | |
| 2 | Parcel (PA) | X | | | D | X | | |
| 3 | Parcel (PA) | X | | | D | X | X | X |
| 4 | Parcactel (PA) | X | | | D | X | | |
| | . . . | | | | | | | |
| 23 | Parcel Austria | X | | | AT | | | |
| 24 | Parcel EU | X | | | EU | X | | |
| | . . . | | | | | | | |
| 33 | Package 10 kg (P10) | | X | | D | | | |
| 34 | Package 10 kg (P10) | | X | | D | X | | |
| | . . . | | | | | | | |
| 43 | Package 20 kg (P20) | | | X | D | | | |
| | . . . | | | | | | | |

Example of a Positive List

One or more countries can be referenced via a list of ISO codes (3-digit, analogous to maptos) in each line.

The special abbreviation "EU" stands for all EU countries (these are stored in a list).

Product Attributes

In addition to the price information, additional attributes are associated with each line of the positive list:

product key (for improving the payment assurance), product key ESI, product code (constituent of the routing code, 2-digit), method number (ESI and label printing), participation (ESI and label printing), product code label (necessary for label printing), service code label (necessary for label printing), feature string label (necessary for label printing), sorting key; determines the sequence of the display and which product will be used as the default.

Product Selection According to Country

On the NOW2 page, the products can be selected as a function of the country of the recipient: the only products that are offered are those that are associated with that country.

Hierarchical Data

Elements such as prices, modules, voucher definitions and discounts can be defined on the level of marketplace actions (valid for precisely one marketplace and one configurable period of time), a marketplace (valid without a period of time for precisely one marketplace) or completely marketplace-unspecific (valid for any marketplace without a period of time), whereby the "higher" definition is decisive, even if other prices or modules exist. The elements of the marketplace-unspecific level are mandatory elements, whereas those of the two other levels are optional.

Objects that support this approach are provided with a MTW header (Marketplace-Time-Period) having the following attributes:

| Attribute | Description |
|---|---|
| Marketplace | Optional marketplace identification |
| Valid from | The data record is valid starting at this point in time |
| Valid until | The data record is valid until this point in time |
| Activated | At this point in time, the data record was activated. |
| SymbolName | Symbolic name for the data record. Two data records with the same symbolic name are viewed as equal and only the "newer" information (attribute activated) is used. |

MTW header

If, for example, no marketplace action price is defined for "Parcel D" [D=Germany] at the current point in time, a marketplace price for "Parcel D" is sought. If this is likewise not defined, then the price in the marketplace-independent price list is used.

Information that is stored in this manner is not internationalized. In case of doubt, this can be mapped by a marketplace-dependent configuration.

Prices

Partial prices can be defined for the products in the positive list, namely, for combinations of basic product and country ("Parcel D"), service and country ("Roll Service D").

At first, the total price of a product line then results from the sum of the individual prices.

The default price list (marketplace-independent) can be as follows:

Default price list (Table I) - an example

| Basic products and services | Country | Price |
|---|---|---|
| Parcel | | 9.80 euros |
| Parcel | DEU (Germany) | 2.90 euros |
| Parcel | AUT (Austria) | 7.80 euros |
| Parcel | EU | 8.60 euros |
| Package 10 kg | | 15.00 euros |
| Package 10 kg | DEU (Germany) | 5.90 euros |
| Package 10 kg | EU | 13.90 euros |
| Package 20 kg | | 22.80 euros |
| Package 20 kg | DEU (Germany) | 8.90 euros |
| Package 20 kg | EU | 18.90 euros |
| Green | | 0.60 euros |
| Green | DEU (Germany) | 0.10 euros |

-continued

| Default price list (Table I) - an example | | |
|---|---|---|
| Basic products and services | Country | Price |
| Green | EU | 0.40 euros |
| Roll service | | 1.90 euros |
| Roll service | DEU (Germany) | 1.50 euros |
| Roll service | EU | 1.60 euros |

In this list, every basic product and every service—except for TAS pick-up—has to be provided with a price as a "countryless" entry. All of the other entries are optional. If, for example, no price for (parcels, DEU (Germany)) were to be defined, then the price of (parcel, *) would be used as the specification.

This list can be defined multiple times for various levels. For the other two levels, all of the price specifications are optional, i.e. prices can—but do not have to—be defined here. This method ensures that a price can be determined for any combination of (basic product, country) or (service, country).

Via a suitable search sequence, an unambiguous price can be calculated for each line of the positive list (and if applicable, depending on the marketplace and on a point in time). This price is simply the sum of the price for the basic product+country and the applicable services+country.

In a refinement, a detailed price model can be implemented in which individual lines of the positive list can also be provided with prices ("product/service combined prices").

Example

In addition to the default price list above, two additional price lists are defined. First, specific prices for the Provider marketplace:

| Marketplace Provider default (Table II) | | |
|---|---|---|
| Basic product | Country | Price |
| Parcel | DEU (Germany) | 2.50 euros |
| Package 10 kg | AUT (Austria) | 11.00 euros |

For the marketing campaign on the Provider marketplace in calendar week 50 (CW 50), a specific price is defined for a parcel DEU (Germany) (the beginning and end of the period of time can be indicated down to the minute):

| Marketplace Provider week campaign CW 50 (Table III) | | |
|---|---|---|
| Basic product | Country | Price |
| Parcel | DEU (Germany) | 2.00 euros |

Example Results I

Search Criteria:

The current point in time (the server time is decisive here) is in calendar week 49 (CW 49), i.e. the validity falls outside of the period of time for which Table III is valid.

The destination country for the shipment in the example is Germany (DEU).

The marketplace of the user is Provider

The table below contains the partial prices for the product Parcel+Roll Service and Package 10 kg:

| Product | Partial prices and price table employed |
|---|---|
| Parcel + Roll Service | 2.50 (II) + 1.50 (I) |
| Package 10 kg | 5.90 (I) |

Example results I (the Roman numerals behind the prices indicate the price table that is used in each case).

Example Results II

The search criteria are selected as above, except that the current server time is selected as a definable period of time, for example, a day, a week or a month.

The following table contains the partial prices for the product Parcel+Roll Service and Package 10 kg:

| Product | Partial prices and price table employed |
|---|---|
| Parcel + Roll Service | 2.00 (III) + 1.50 (I) |
| Package 10 kg | 5.90 (I) |

Example results II (the Roman numerals behind the prices indicate the price table that is used in each case).

Price Attributes

The table below describes the attributes of a single price:

| Attribute | Description |
|---|---|
| MTW header | Information about the marketplace and period of time, also see |
| Basic product/ service | Reference to a basic product or service whose price is stored in this data record ("TAS pick-up") |
| Gross price | Gross price ("2.10") |
| Value added tax | Subject to value added tax: yes/no (internal storage: ZERO or, for example, VAT-D) [D = Germany] |
| Product reference | Phase II: an optional reference to an individual product on the positive list; in this case, the line of the positive list to which the price belongs would be described; the basic product/service attribute then describes the column within this line. |

Attributes of a Price

Pick-Up and Pick-Up Price

A pick-up is arranged for parts of the shopping cart or, which is especially preferred, for the entire shopping cart.

The booking of the pick-up is carried out explicitly on the NOW1 page or implicitly through the entry of a voucher code that comprises a TAS pick-up.

By adding the voucher code to a mailpiece or by transmitting the voucher code to a first recipient of a mailpiece, it is possible to produce return labels. By generating return labels, an exemplary embodiment of the present invention forms a method for handling returns.

The prices for the pick-up are indicated on a scale (maximum of 5 entries), for example, as in the table below:

| Number of shipments | Price |
|---|---|
| 1 | 2.00 euros |
| 2 | 1.80 euros |
| 3 | 1.50 euros |
| 4 | 1.00 euros |
| 5 | 0.00 euros |

Examples of prices on a scale

The number of all shipments in the shopping cart that can be picked up (on the basis of the positive list) is used to find the price in the table. In case of more than five shipments, the last price of the table is used (therefore, according to the example table, a pick-up of more than 5 shipment is always free of charge—whereby this is just by way of an example).

Definition of the Scale

The price scale for the pick-up can be indicated hierarchically, analogously to the other prices.

| Attribute | Description |
|---|---|
| MTW header | Information about the marketplace and the period of time |
| Number | Number of parcels for which the price applies |
| Gross price | Gross price ("2.10") |
| Value added tax | Subject to value added tax: yes/no |

Definition of a Price Scale

Modules

Modules are a rectangular area on a web page and can be configured hierarchically. They contain an HTML fragment that, if applicable, can, in turn, reference individual images, css-files, etc. Modules are addressed via a logical name.

| Attribute | Description |
|---|---|
| MTW header | Information about the marketplace and the period of time |
| HTML fragment | The HTML fragment that describes this module. This pops up as is at the appropriate place in the website. |
| Resources | References to additional resources (images, css-files) that are referenced by the HTML fragment. |

Attributes of a Module

Vouchers

It should be possible to grant price advantages to customers when they purchase vouchers on the web platform in packs. Furthermore, special marketing campaigns should be possible within the scope of which vouchers or their codes are distributed, for example, via print media.

| Attribute | Description |
|---|---|
| MTW header | Information about marketplace and period of time |
| Screen name | Most unambiguous name possible for the voucher definition; is used for the display |
| Description | Short description; for display in the shopping cart |
| Type | Promotion or purchase voucher |
| Product reference | Reference to specifically one product in the positive list |
| Absolute value | (Only for promotion vouchers) |
| Denomination | Maximum of five individual items |
| number | for example, "10-pack" |
| price | price for the special denomination |
| product key | unambiguous product key |
| Specification denomination | The denomination that is to be used as the specification. |
| Duration of the sale | Only for a marketplace campaign: the period of time during which the voucher is offered on the website; date-from and date-until mandatory fields |
| Relative duration | How long in days is the voucher code valid after the purchase date? |
| Absolute duration | Until which date is a voucher code valid? |
| Reusable | Can a voucher code be used one time or multiple times? |

-continued

| Attribute | Description |
|---|---|
| Display key | Numeric key, by which the sequence of the display of the voucher definition is controlled |

Attributes of a Voucher Definition

Voucher Definition

Before vouchers can be purchased by the user or distributed within the scope of marketing campaigns, vouchers have to be defined on the administrative level.

Voucher Name

Voucher definitions are addressed by their name (screen name) which is freely assignable but as unambiguous as possible when it is established.

Voucher Type

When the voucher definition is established, it is specified whether it is a promotion voucher or a voucher (code) that has to be purchased by the user.

Product Reference

In the definition of a type, one specific product from the positive list is referenced. This information determines whether a voucher can be used on a mailpiece:

If the basic products match and if all of the services of the referenced product are contained in the shipment product, then the voucher can be used. Hence, a selected shipment can comprise more services than are defined in the referenced product, but never fewer.

Value of a Voucher

A voucher can either have an absolute monetary amount ("value 10 euros") or it can be redeemed precisely for the product for which is has been stored (100% voucher).

The accounting is then only carried out for these components, i.e. any negative prices that result from redeeming the voucher are shown with the price 0 euros.

Example:

The 100% voucher covers the product "Package including TAS pick-up". For the shipment in the shopping cart, the product "Package including TAS pick-up and roll" has been selected by the user. As a result, the user only still has to pay for the service "roll".

The "value" of a voucher might not have been used up completely, for example, if a voucher price is higher than the currently valid price for "covered" products; in this case, the remaining value of the voucher lapses.

Denomination (Only for Purchase Voucher)

The user can purchase vouchers in packs. For this purpose, a denomination can be defined with up to five different denomination sizes (e.g. "5-pack, 10-pack, 20-pack, 50-pack, 100-pack"). For each denomination size, a separate absolute price including value added tax is defined. One of the denominations is defined as the specification value.

Validity for Sale

The period of time during which the voucher is offered for sale to the user is defined in the form of a time span. The end of the period of time can be limited or unlimited.

Information about the Redemption Conditions

Purchased vouchers can only be redeemed after the purchase, i.e. after they have been paid for and are available to the user in the form of voucher codes.

The period of time an individual voucher code can be redeemed is defined in the form of a time span. This is either a relative figure in days ("to be redeemed a maximum of 30 days after purchase") or an absolute date ("until DD/MM/YYYY").

Purchased vouchers can only be used once. In the case of promotion vouchers, as an alternative, it can be specified whether the codes can be used any desired number of times. These can then be redeemed for one or more shipments in a single shopping cart.

For example, vouchers can be generated for printing campaigns and they can be used as often as desired. As an alternative, promotion vouchers can also be generated for e-mail campaigns that, analogously to purchase vouchers, can only be used once.

However, regardless of the type of voucher, it is always the case that, at the maximum, only one code can be redeemed per shipment.

Marketplace

Optionally, a voucher type can be associated with a single marketplace. The vouchers are then only offered for sale on this marketplace. The purchased voucher codes can be redeemed exclusively on this one marketplace.

Display Sorting

Each voucher is associated with a numeric sorting number with which the display sequence can be determined.

Voucher Codes

Voucher codes are generated either at the time of the purchase of a voucher set or when promotion codes are generated via the admin-web.

A single voucher is defined using this unambiguous alphanumeric designator (voucher code), which should not be easy to guess. The code is stored in the system with the appertaining data.

As a component of the 8-digit voucher code, the following 31 characters are valid:

digits “2” to “9” and the letters “A”-“H”, “K”-“N”, “P”-“Z”.

This yields a theoretical set of 852,891,037,441 (approx. 850 billion) voucher codes. This is intended to prevent any collision, i.e. multiple use of the same codes, and to make it difficult to guess a given code.

Shopping Cart ID

Each newly created shopping cart is associated with the generation of an unambiguous numeric shopping cart ID. This is displayed to the customer on the NOW3 page. Moreover, once the booking has been successfully completed, this ID appears on the account statement of the user. On the basis of this ID, users can reference their shopping cart, for example, in case of support questions by phone.

Validation before the Display of NOW1

These checks are carried out every time before the shopping cart page NOW1 is displayed. Status and error messages are displayed either shipment-based or else for the entire shopping cart.

Each shipment is checked to see if it is error-free; if applicable, this is optimized via status information in the shipment position. The information and error messages shown for each shipment are updated.

If a TAS pick-up has been booked, it is checked whether the pick-up time is still valid and whether the pick-up address can be TAS routing-coded, if this had not already been checked. In case of an error, a shopping cart-based error message is displayed to the user on NOW1.

Redeeming Vouchers

If a voucher code is redeemed for a shipment, then, on the basis of the data stored in the database, it is checked whether it is valid:

Is the code a valid code at all, i.e. is it present in the database?

Does the stored voucher type match the product of the shipment, i.e. is the shipment product contained in the positive list of the voucher type?

Has the voucher already expired (“shelf-life”)?

In the case of one-time vouchers:

Has the voucher already been redeemed (in the current shopping cart or in the database)?

Paying for the Shopping Cart

In this paragraph, the procedures are described that are performed when the user carries out the action “Proceed to check-out” on the NOW1 page.

Fundamental Validations

First, the checking procedures are carried out as described in paragraph 0. If these or one of the following conditions are not met, this is displayed to the user in the form of an error message on the NOW1 page.

Is the shopping cart empty?

Has the e-mail address been recorded and is it plausible (regular expression validation)?

General terms and conditions accepted?

If the price of the shopping cart is not “0” (for example, all shipments paid-for by vouchers):

Payment modality selected? If applicable, also postal code recorded?

Is the value of the shopping cart within the range configured for the marketplace and the payment modality?

If a TAS pick-up has been booked:

validation of the recipient address (request for the TAS interface; can take place in a call for n addresses).

Are the redeemed vouchers still valid? (Even though this validation is already carried out when the codes are entered, this is repeated here for security reasons, since the code could likewise be used in another session.)

Has the shopping cart price changed in comparison to the last price calculation and the newly calculated current price? If yes, the updated prices are displayed to the user in NOW1 with a note to that effect, after which the user can once again launch the payment action.

Preparation of the Payment

The preliminary checks have shown that the data in the shopping cart is valid and that the payment procedure can be prepared.

This is followed by the persistent storage of the shopping cart data in the database as an additional step.

Once this step has taken place without error and if the price of the shopping cart is not “0”, then the user is directed to the pages of the payment provider (redirect instructions to the web browser of the user).

If the user aborts the payment procedure there, he or she is directed back to the NOW1 page, is shown a message to this effect there and can further process the shopping cart.

Once the payment procedure has been successfully completed, the process continues with the next step.

Actions Immediately after the Payment

After the successful payment, POP receives feedback from the payment system. Subsequently, the following actions are carried out:

the shopping cart is marked as having been paid, voucher codes are used, data for PDF generation is stored; document IDs are generated; numbers are taken from number sets, if applicable, order TAS pick-up, envelope data for EDICC is stored in the database, e-mail is sent to the user.

If errors occur during these steps, the application nevertheless attempts to carry out all of the further steps if at all possible. A rollback is not performed, since in some cases, the interfaces do not offer the possibility to cancel. Warning and error messages that occur during these processes are, of course, stored persistently in the database.

PIN/PIN2

A link with an attached key is embedded in the confirmation e-mail to the user, who can also use this key to subsequently open the NOW3 page. If the shopping cart exceeds a certain value, this access is additionally secured through the entry of a PIN or PIN2 (both four-digit numerical values). The PIN is displayed to the user immediately after the purchase of the shopping cart on the NOW3 page—provided with an applicable informative note. As an alternative, he or she can also enter the PIN2 that can be found on his or her account statement.

PDF Label

The application “PDF label” generates PDFs with labels that can be printed out by the user and glued onto the shipment (parcel, package, etc.).

In a preferred embodiment, the PDF has the following components:

the actual postage label: label
- as a sample imprint and
- as a postage imprint drop-off receipt an electronic or PDF envelope around the postage label that controls the one-time print.

Product-Dependent Label

For each product-service combination, a corresponding PDF master copy for the generation of the labels can—but does not have to—be stored in the application.

Fields of the Label

The following breakdown of the components corresponds to the technical specification Common Label.

Product/Logo Block

The product/logo block contains a logo of a company and the product name of the basic product. The product name is ascertained from the product configuration.

Sender Block

The sender block corresponds to the Common Label specification in the table below:

| Field name | Type | Description |
|---|---|---|
| Name,<br>title | string (35)<br>2 lines | First name and last name<br>Company name |
| Street,<br>house number | string (35) | |
| Postal code<br>city | string (35) | The country is not printed by the application. |
| Country | string (35) | Country in capital letters |

If a data field is too long for the number of characters provided for by the Common Label specification, the imprint is cut off on the right-hand side.

Recipient Block

The recipient block corresponds to the Common Label specification in the table below:

| Field name | Type | Description |
|---|---|---|
| Name,<br>title | string (35)<br>2 lines | First name and last name<br>Company name |
| Street,<br>house number | string (35) | |
| Postal code<br>city | string (35) | |
| Country | string (35) | Country in capital letters |

The same restrictions apply as for the sender block.

Product Property Block

Product-specific characters can be printed into the product property block. The content of the imprint is configured for each product.

Shipping Information Block

The following information is printed into the shipping information block:

| Field name | Type | Description |
|---|---|---|
| Billing no. | string | Contains EKP number + participation + method<br>The EKP number is configured in the application for the combination of payment platform and marketplace.<br>Participation is always “00”<br>The method is configured in the application for each product. |
| Shipment no. | string | Contains the Identcode of the shipment |
| Dimension/<br>weight | string | Dimension: if applicable data for this shipment has been supplied by maptos, this data is entered.<br>Weight: if applicable data for the shipment has been supplied by maptos, this data is entered. Otherwise, a standard weight configured for each basic product is imprinted. |

Customer Information Block/2D Barcode Block

The customer information block is not used by the application.

It is advantageous to generate a drop-off receipt.

This drop-off receipt has a regular paper format (for example, DIN A 6 through DIN A 4). Preferred data contained the drop-off receipt is:

| Field name | Description |
|---|---|
| Identcode | Numeric Identcode (IDC) |
| Recipient | Recipient address (name, street, number, postal code, city, country) |
| Product | Name of the product, see product/logo block |
| Weight | Weight of the shipment in kilograms.<br>see shipping information block |
| Services | Services from the handling information block |
| COD | Amount and currency, project phase I empty |
| Date | Current date (printing date) |
| Name of the ordering party | Sender (name) |
| EKP number | EKP number, shipping information block |
| Shopping cart number | Application-specific number for a shopping cart/payment action |

General

In a refinement of an exemplary embodiment of the present invention, the label to be printed is provided with a PDF envelope. Within this envelope, the printing of the document contained in the PDF envelope is controlled within the scope of communication with a license service. In order to take this into account, this document is referred to as an iPDF in the present patent application.

The following process steps are carried out in this context:

POP application:

During (or possibly in advance of) the generation of the PDF, each PDF is linked to an unambiguous document ID that cannot be guessed by the user by trial-and-error.

This document ID is embedded on the one hand into the iPDF and on the other hand also into a database table of the POP application.

Figure 3:
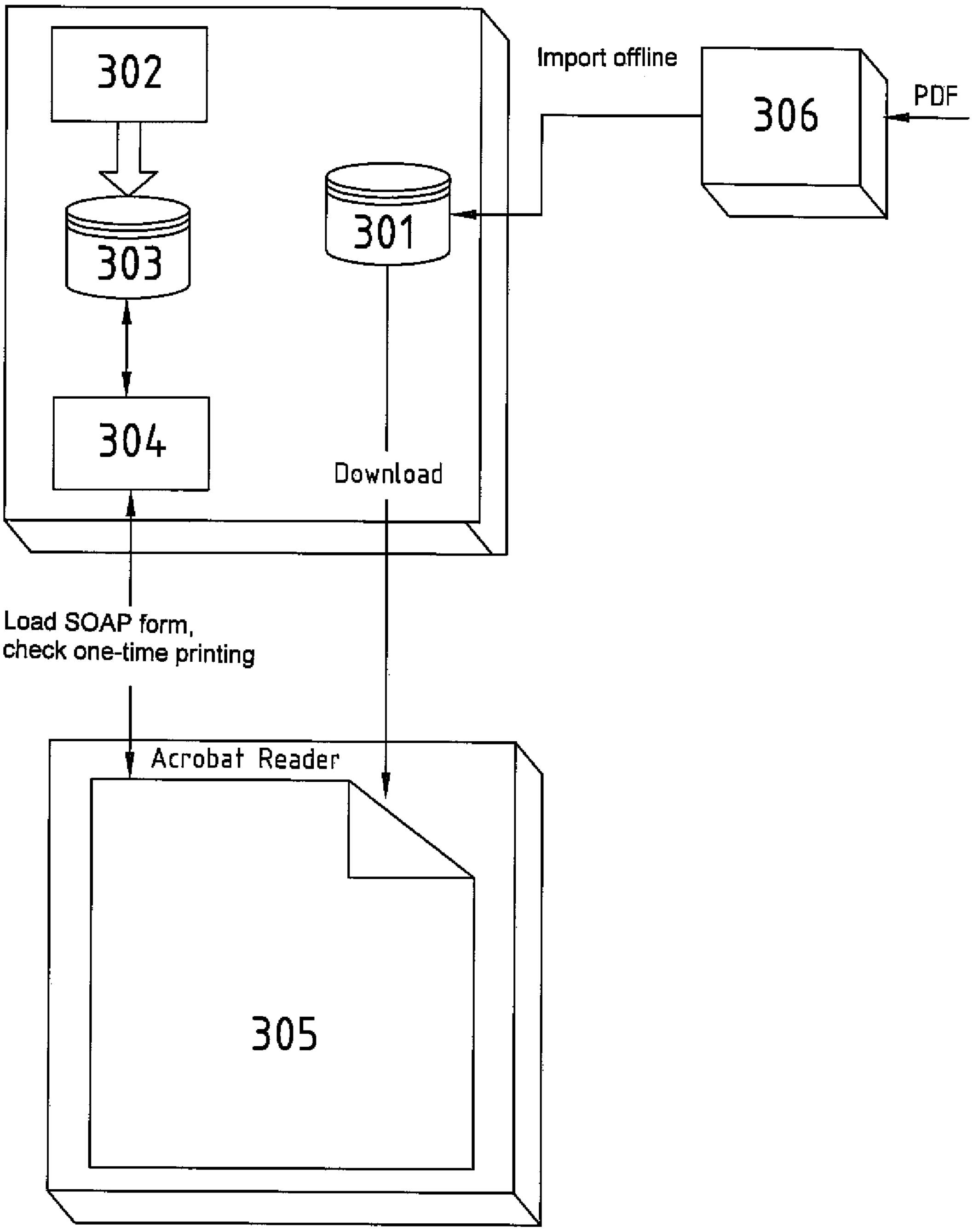
FIG. 3 is a block diagram useful in explaining an integration of a document production into a system according to an exemplary embodiment of the present invention.
Figure 4:
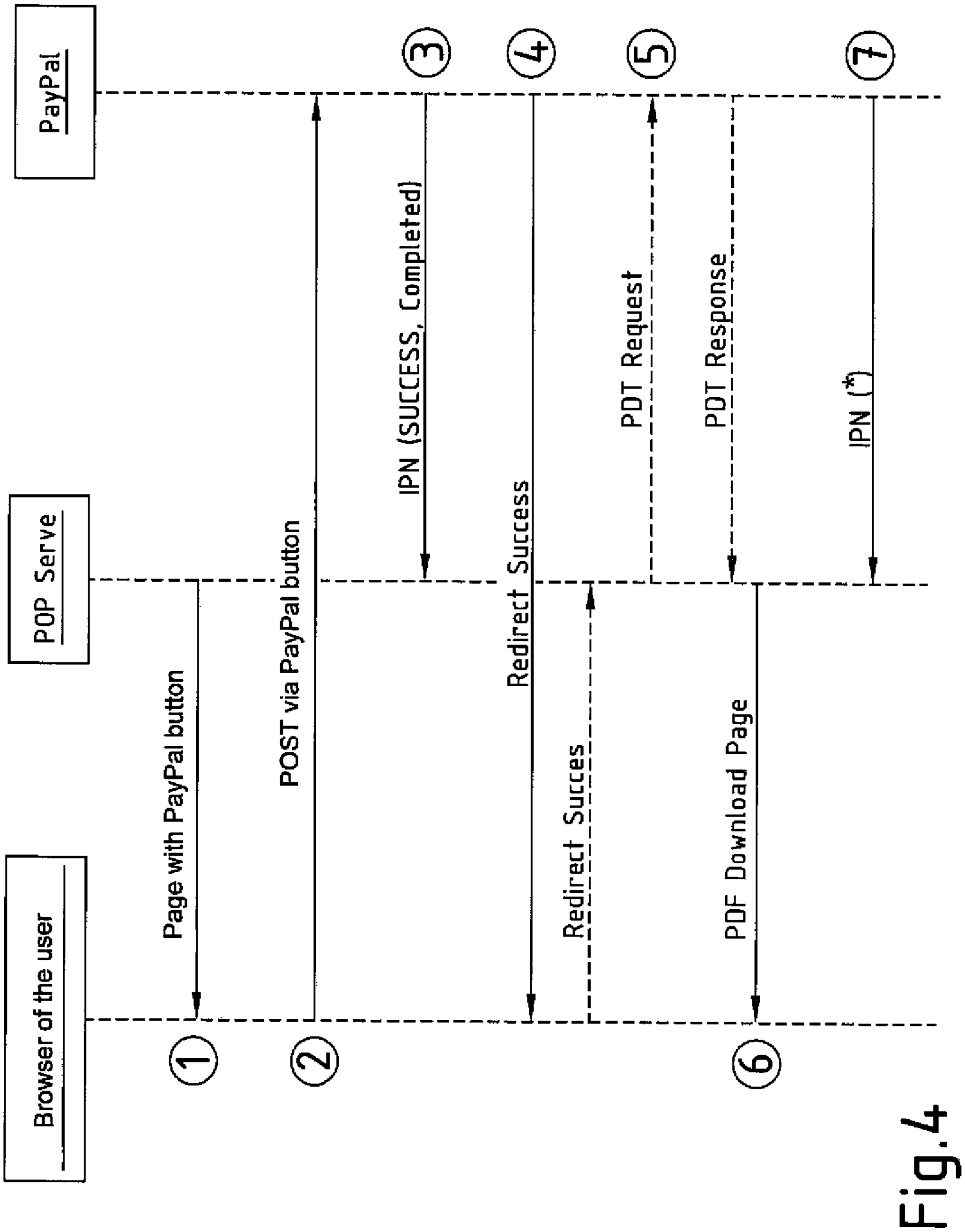
FIG. 4 is a flow chart of a preferred integration of payment procedures according to an exemplary embodiment of the present invention.

FIG. 3 shows a schematic depiction of an integration of a document production into a system according to an exemplary embodiment of the present invention.

The depicted system comprises a server that allows the transmission of displayable contents.

The displayable contents consist of static contents and dynamic contents.

In the embodiment shown, the static contents are incorporated as PDF templates into a document that is to be generated.

Dynamic contents are incorporated by a suitable server, preferably by a POP web server 302, into a document data record 303. These dynamic contents can optionally be augmented by additional contents. These additional contents can be static contents or dynamic contents, depending on the intended use. The addition of dynamic contents is preferred since this allows identifiable documents to be created in a simple and practical manner.

In an especially preferred exemplary embodiment of the invention, this is done in that the dynamic contents are linked to licensing information 304.

Below, an exemplary embodiment of the present invention will be explained on the basis of the production of labels. The labels are, for example, address labels and/or franking labels. Such labels are especially well-suited for controlling logistical procedures such as, for instance, tracking and tracing as well as for controlling logistical processes such as, for instance, sorting mailpieces.

For this purpose, the labels are preferably configured to be machine-readable.

The label that is to be printed is provided with a PDF envelope. A transmission of the licensing information 304 is made possible inside this envelope, within the scope of communication with the server.

Consequently, by incorporating the licensing information 304, a licensing service is provided for printing the PDF envelope. The license service controls the printing of the document contained in the PDF envelope.

Since intelligent documents are provided in this manner, they are described below as iPDFs.

The following process steps are carried out in this context:

POP application:

During (or possibly in advance of) the generation of the PDF, each PDF is linked to an unambiguous document ID that cannot be guessed by the user by trial-and-error.

This document ID is embedded, on the one hand, into the iPDF and, on the other hand, also into a table of a database of the application.

In order to prevent multiple print-outs, mechanisms are built into the PDFs delivered to the user and, prior to every printing operation, they check whether the document has already been printed before.

In order to check this, a connection with a service provided by the POP application has to be made from the Acrobat Reader and this checking procedure is carried out via the application.

Once the user has purchased a product using the payment functionality of the application, all of the data needed for the generation of the PDFs is also present.

At this point, the server application generates a data record for each PDF to be generated on the basis of the shopping cart and all of the information needed for the generation is already completely resolved in this data record.

An advantageous data record for checking the one-time printing is depicted below.

Document Data Record

| Field name | Type | Description |
|---|---|---|
| Document ID | ID (PK) | ID of the document. This ID is also embedded in the delivered iPDF envelope. |
| CreateDate | TimeStamp | Time stamp of the generation of the PDF |
| ValidUntil | TimeStamp | Valid until |
| Printed | TimeStamp | Was the PDF already printed? |
| DownloadedFirst | TimeStamp | When was the PDF downloaded for the first time? |
| DownloadedLast | TimeStamp | When was the PDF downloaded for the last time? |
| DownloadCounter | Integer | How often was the PDF downloaded? |
| FormData | Blob | The form data of the PDF. This includes: Sender address and recipient address. Codes for barcodes. Product services (e.g. green parcel) Information about selected additional services, insofar as they relate to the imprint. Information relating to the type and/or scope of the merchandise to be sent back. |

FormData contains all of the already resolved data in a structured form (XML) relating to the data to be imprinted. Thus, for example, the already generated parcel identifiers, routing codes and optionally additional information (also prices, although this is currently not provided for) are already given as numbers or characters strings. A subsequent calculation of such data is not provided for since this might possibly yield different results.

Furthermore, references to the PDF master copy as well as the coordinates for the imprint have to be given in this FormData field. Resource IDs from the configuration repository are used for this purpose. Since the resource behind a resource ID does not change during the lifetime of the application (i.e. also in a changed version by changing the application configuration), a generation of the PDF will always yield the same results.

In the manner described, it is possible to generate PDFs or other intelligent documents as set forth in an exemplary embodiment of the present invention on the basis of a document data record. The document data record has, for example, the field contents described above.

After a suitable request has been called up, a document ID can be made available to the user via a URL and can be downloaded later in the form of a URL.

Example:

http://pop.dhl.de/
getPDF?documentId=abxkdl2fszo8afwg30y

A PDF can be generated directly on the basis of the document ID.

Since the document downloaded by the user only constitutes an empty form, a general PDF—optionally individual for each product (product key)—can be made available.

The servlet that delivers the PDF now merely has to rename the file name for the PDF in such a way that the document ID is contained in the file name.

Signing the Document via ARES 306

The master copies are signed offline by the Acrobat Reader Extension Server during the development or preparation phase for a new product.

In the application, the document signed by the ARES 306 is then imported into the configuration repository.

iPDF Envelope, Sample Document and Postage Document

After the user has downloaded the generated PDF, the envelope of the PDF is displayed to him or her on the first page.

When the PDFs are downloaded in a suitable program, especially an Acrobat Reader, it is advantageous to carry out individual, several or all of the following checking steps:

compatibility of the reading program, existence of an Internet connection, validity of the document ID, checking whether a print-out has already been made.

For the latter two checking steps, a service made available by the application is called via the SOAP interface of the Acrobat Reader, and this service reports back whether the transmitted document ID is present and/or is marked in the database as already having been printed before.

On the basis of the document ID, the form fields are downloaded via the SOAP interface by the POP's own server and then filled.

If no document ID could be ascertained, for example, since the user has renamed the PDF document, he or she is prompted via an Acrobat form field to enter the document ID. The document IDs are also included in the e-mail that is sent to the user.

Dummy codes are used for the barcodes for the sample printing. Only for the actual printing of the postage are the correct barcodes then briefly set by JavaScript.

Employed PDF Reader Functionality (Technology)

The application uses the following JavaScript functions for the dynamic query to the license server from the Acrobat Reader:

app.viewerVersion: for checking the Reader version.

SOAP.*: to check for an Internet connection.

document.getField("field name").display=display.hidden/display.visible: for fading in and out "sample" overprints document.print ({bUI: true, nStart: 1, nEnd: 1, bSilent: true, bAnnotation: true}) or document.print ({bUI: false, nStart: 1, nEnd: 1, bSilent: true, bAnnotation: true}) for directly printing the document without user interaction.

The actual PDFs to be printed are stored as annotation form fields (originally for visual feedback—e.g. when a button is pushed—in order to distinguish between the printed and non-printed states) and only switched to "visible" immediately before the printing.

Barcode fields. The Acrobat Reader supports form fields that display an appropriate barcode for a value (as a rule, numerical value).

As an alternative, special fonts that are embedded in the document can be used for barcode fields.

For barcode types that Acrobat Reader does not support internally or through additional fonts, the barcode can be downloaded as a bitmap image via an external URL. For this purpose, a servlet service that generates and makes available the appropriate bitmap would have to be implemented in the application.

The described functionalities have a number of advantages:

Since the user does not download an individualized PDF, the PDFs only have to be signed per template/product via the ARES server.

As a result, an ARES 306 is not needed during the normal operation of the application.

It is advantageous to use the ARES 306 to insert new document types—especially to insert new products of a service provider—in order to sign the PDF in question once. Within the application, the signed document is then inserted as a resource. This installation of the ARES 306 can be effectuated on any computer. The interface for signing a document master copy can be configured in a simple manner.

The download of the PDF is a simple—virtually static—delivery of a file by the POP application. Any performance-relevant processes for the imprint can be dispensed with.

The PDFs can be generated with standard tools that are provided, for example, by the Adobe Company (with Acrobat Professional, the position of the form fields can be defined). The filling of the PDF form fields within the Acrobat Reader is a standard function.

Moreover, by dispensing with the necessity of signing each individual

PDF, any error sources or performance bottlenecks that might occur here are also eliminated.

The elaborations selected above relate to PDF documents. However, it is likewise possible to use documents and programs that have comparable functions.

Documents can preferably be displayed graphically. Depending on the area of application, they can be recorded manually or by machine. Moreover, depending on the area of application, it is also advantageous to provide for encryption.

An exemplary embodiment of the present invention also comprises documents that cannot be displayed graphically. Documents as defined in the present invention comprise SmartLabels. SmartLabels are RFID identification devices (transponders). They are suitable to be used for control processes in the processing or transporting of physical objects, especially of mailpieces or other goods that are to be transported.

The presented exemplary embodiments of the invention may be associated with a number of advantages:

It is possible to change the layout of the labels in a simple manner and, to a limited extent, even to adapt the functionality of the "intelligent PDFs" without having to launch the application anew (unlike the case with Stampit-Web), i.e. only the PDF master copy is replaced.

As an alternative, it is possible to provide a new format master copy on the production systems via configuration update/admin-tool.

An increase in performance is achieved so that less server capacity is needed.

Data protection and security are increased, because no application-specific data, addresses, product information, are contained in the PDF—in the PDF master copy—even when the PDF is stored, after the data has been transferred via SOAP call for printing and/or after the printing has been initiated.

In especially preferred exemplary embodiments of the invention, it is possible to ascertain and, if applicable, also to log the configuration of user systems—especially of user computers that are being employed—if applicable, including the program versions employed.

The servlet that delivers the PDF now merely has to rename the file name for the PDF in such a way that the document ID is contained in the file name.

Signing the Document via ARES

The master copies are signed offline by the Acrobat Reader Extension Server during the development or preparation phase for a new product.

ARES itself does not have to be installed in the product environment, but rather has to be installed externally on a simple PC with Linux. For this purpose, a command line tool is used with which any PDF documents can be provided with the requisite rights via the ARES.

The document signed by ARES is then imported in the application into the configuration repository.

iPDF Envelope, Sample and Postage Document

After the user has downloaded the generated PDF, the envelope of the PDF is displayed to him or her on the first page.

Here, the checking procedures are carried out when the PDF is loaded in Acrobat Reader:

Acrobat Reader compatible (version≧6.02)?

Is there an Internet connection?

Is the document ID valid?

Has the product already been printed out before?

For the latter two checking steps, a service made available by the application is called via the SOAP interface of the Acrobat Reader, and this service reports back whether the transmitted document ID is present and/or is marked in the database as already having been printed before.

On the basis of the document ID, the form fields are downloaded via the SOAP interface by the POP's own server and then filled.

If no document ID could be ascertained, for example, since the user has renamed the PDF document, he or she is prompted via an Acrobat form field to enter the document ID. The document IDs are also included in the e-mail that is sent to the user.

Dummy codes are used for the barcodes for the sample printing. Only for the actual printing of the postage are the correct barcodes then briefly set by JavaScript.

The codes can be used, for example, as routing coding.

Routing Coding

Two different interfaces are used for the routing coding:

The "Webbooking—routing code check (eShop, FBE)" interface is used for checking whether the pick-up and recipient addresses can be routing-coded.

The existing implementation of the Online Label Print application in the current version is used to generate routing codes for recipient addresses—which are also imprinted onto the PDF label as a routing code in the form of a barcode.

Online Label Print Routing Coding

The routing code module of the Online Label Print application is used for the routing coding of the recipient addresses.

It is assumed that the appropriate tables can be transparently accessed on the part of the POP application via a data source that is configured in the application server.

The implementation that accesses these routing code tables is taken over as is by the Online Label Print application. The maintenance and updates of these tables or data are not a constituent of this SRS.

Webbooking—Routing Code Check (eShop, FBE) Interface Basis

The basis of the interface description is the following document:

"FBE-Schnittstellenuebersicht_eFiliale__2__0.doc" ("FBE Interface Overview_eBranch__2__0.doc"), referred to below as the reference document.

Description

Using the interface, it is checked whether the pick-up address and the recipient addresses can be routing-coded. The interface does not feed back a routing code.

Checking whether the addresses can be routing-coded is carried out by a function of the TAS. Thus, the interface used is the one that is implicitly used for the "Webbooking—routing code check (FBE, TAS)" interface.

Addresses that cannot be routing-coded are marked as such in the GUI.

Semantics of the Interface

Input (RoutingCodeRequest.xsd)

TABLE 1

Input parameters for ability to be routing-coded (RoutingCodeRequest.xsd)

| Element | Purpose | Description |
|---|---|---|
| Request | Type: Variant: element Father element: — | The request for routing code check. Father element <Request> . . . </Request> |
| AddressList | Type: TypeAddressList Variant: element Father element: - request | List of the addresses to be checked. Father element pertaining to addresses <AddressList> . . . </AddressList> |
| MaxSizeListResponse | Type: TypeMaxSizeListResponse Variant: element Father element: - request | Description: maximum number in the list of alternative addresses (each address to be checked) in the response. No alternative addresses are evaluated, hence always "0". |
| MinHitProbablity | Type: Globals: TypeHitProbability Variant: element Father element: - request | Minimum hit probability for alternative addresses as a percentage: always "100" since the address has to be codable. No alternative addresses are evaluated. |
| Trailer | Type: Trailer: TypeTrailer Variant: element Father element: - request | System and time of day of the request, e.g. POP DD/MM/YYYY T09:00:00 |
| Address | Type: CheckAddress: TypeAddressRequest Variant: element Father element: - request | Description: address to be checked |

Address Request (TypeAddressRequest from CheckAddress.xsd)

TABLE 2

Address Request (TypeAddressRequest from CheckAddress.xsd)

| Element | Purpose | Description |
|---|---|---|
| Street | Type: xsd.string Variant: element Father element: — | Street of address |
| House number | Type: xsd.string Variant: element Father element: — | House number of the pick-up address |
| StreetHouseNumber | Type: xsd.string Variant: element Father element: — | Not used |
| Postal code | Type: xsd.string Variant: element Father element: — | Postal code of the address |
| City | Type: xsd.string Variant: element Father element: — | City of the address |
| Country code | Type: TypeCheckStatus Variant: RawDataRecord: CountryType | Three-digit country abbreviation according to ISO 3166-1, e.g. "DEU" for "Germany" |

TABLE 2-continued

| Address Request (TypeAddressRequest from CheckAddress.xsd) | | |
|---|---|---|
| Element | Purpose | Description |
| | Father element: — | |
| ID | Type: Globals: TypeID<br>Variant: attribute<br>Father element: — | Unambiguous ID of the address to be checked. This has to be indicated again as a reference for the address in every response.<br>Consecutive number in the request. |

Output (RoutingCodeResponse.xsd)

TABLE 3

| Output parameters for ability to be routing-coded (RoutingCodeResponse.xsd) | | |
|---|---|---|
| Element | Purpose | Description |
| Response | Type:<br>Variant: element<br>Father element: — | The response to the routing code check |
| Status | Type: Status: TypeStatus<br>Variant: element<br>Father element: response | Processing status |
| CheckedAddresses | Type: TypeCheckedAddresses<br>Variant: element<br>Father element: response | List of the checked addresses. Does not have to appear if an error has occurred during the processing. |
| Trailer | Type: Trailer: TypeTrailer<br>Variant: element<br>Father element: response | System and time of day of the request, e.g. POP DD/MM/YYYY T09:00:00 |
| CheckedAddresses | Type: TypeCheckedAddresses<br>Variant: element<br>Father element: CheckedAddresses | The checked address with additional information |
| CheckingStatus | Type: TypeCheckingStatus<br>Variant: element<br>Father element: CheckedAddress | Status of the checking: OK if it can be routing-coded |
| TASError | Type: TypeCheckingStatus<br>Variant: element<br>Father element: CheckedAddress | Is set if CheckingStatus is “cannot be routing-coded”. Contains a TAS code and an error description |
| AlternativeAddresses | Type: TypeAlternativeAddresses<br>Variant: element<br>Father element: CheckedAddress | List of the alternative addresses for the CheckingStatus ‘alternatives’<br>Is not used |
| Address | Type: CheckAddress: TypeAddressResponse<br>Variant: element<br>Father element: CheckedAddress | Alternative address.<br>Is not evaluated. |

Address Response (TypeAddressResponse from Check-Address.xsd)

TABLE 4

| Address Response (TypeAddressResponse from CheckAddress.xsd) | | |
|---|---|---|
| Element | Purpose | Description |
| Street | Type: xsd.string<br>Variant: element<br>Father element: — | Indication of the Street |
| House number | Type: xsd.string<br>Variant: element<br>Father element: — | Indication of the house number |

TABLE 4-continued

| Address Response (TypeAddressResponse from CheckAddress.xsd) | | |
|---|---|---|
| Element | Purpose | Description |
| StreetHouseNumber | Type: xsd.string<br>Variant: element<br>Father element: — | Is not used |
| PostalCode | Type: xsd.string<br>Variant: element<br>Father element: — | Postal code |
| City | Type: xsd.string<br>Variant: element<br>Father element: — | City |
| CountryCode | Type: TypeCheckStatus<br>Variant:<br>RawDataRecord:<br>CountryType<br>Father element: — | Three-digit country abbreviation according to ISO 3166-1; |
| ID | Type: Globals: TypeID<br>Variant: attribute<br>Father element: — | Unambiguous ID of the address to be checked. |
| HitProbability | Type: Globals:<br>TypeHitProbability<br>Variant: element<br>Father element: — | The hit probability of this address as a percentage. |

An ID for the search address is defined in the search request. The address with the same ID in the XML node <CheckedAddress> is to be selected in the response. If the checking status of this address is "OK", then it is considered that the address can be routing-coded. If one of the addresses cannot be routing-coded, then the service is not available.

Error Handling

If the interface is not available or if the status code has a value <> 0, then the service is not available. The failed search requests are logged.

Description

If POP places orders for TAS pick-up(s), the ordering takes place using the "Webbooking—shipment order (eShop, FEB)" interface. An order is generated for each shopping cart item, i.e. it has to be possible for the pick-up address and the recipient address to be routing-coded. Ahead of time, it is ascertained via the "Webbooking—routing code check (eShop, FEB)—interface" whether the pick-up address and of all of the recipient addresses can be routing-coded.

A cancellation is not carried out.

GiroPay Interface

The products and services ordered by the user are billed using the interface.

Use of the Interface

Integration of the GiroPay Button

On the NOW1 page, there is a GiroPay button and an input field for the bank code. This button does not lead directly to the GiroPay page, but rather opens a popup in which the user is prompted to check his or her e-mail once again. Once the user has confirmed the correctness of his or her e-mail address, the NOW1 page is loaded once again. In this request cycle, the application checks the shopping cart once again with an eye towards any price changes or other inconsistencies (missing information).

If the shopping cart price remains unchanged, then the following actions are carried out:

Generation of the document definition in the database (Document ID).

Generation of the shopping cart in the database (shopping cart ID).

Note: The shopping cart that is persisted in the database contains only the data that is necessary for checking the transaction and for additional steps after the payment (displaying NOW3, generating the e-mail, etc).

Checking the bank code.

Sending the transaction data to the PaySolution server.

Checking the Bank Code

The following mandatory parameters are transmitted in a point-to-point connection via HTTPS with authentication.

| Parameter | Type | Description |
|---|---|---|
| command | string | "diagnosis" constant |
| payment_options | string (50) | "bank transfer; bank code" constant |
| bankcode | number (8) | bank code from NOW1 |

In the same cycle, the GiroPay server responds with appropriate parameters.

Only the response parameter rc is relevant in order to evaluate the checking of the bank code.

In case of a response parameter rc=0, the code of a bank that participates in the GiroPay modality was provided. A payment procedure is initialized.

In case of a response parameter rc=1, the code of a bank that does not participate in the GiroPay modality was provided. On the NOW1 page, the user receives the message, "The bank does not participate in the GiroPay modality".

In case of a response parameter rc=2, an invalid bank code was provided. On the NOW1 page, the user receives the message, "The bank code is not valid. Please check the bank code".

Initialization of the Payment Procedure

The following parameters are transmitted in a point-to-point connection via HTTPS with authentication.

| Parameter | Type | Description |
|---|---|---|
| command | string | "Open" constant |
| payment_options | string (50) | "Bank transfer" constant |
| orderID | string (17) | Unambiguous order number for all marketplaces |
| amount | fixed decimal point number | The amount to be paid |
| currency | string (3) | Currency code according to ISO 4217. Here, the currency configured for the marketplace is used (in Phase I, exclusively euros). |
| bank code | number (8) | Bank code of the bank account, no checking procedure is carried out by POP |
| sessionID | string (255) | Session ID |
| basketID | string (50) | Order number |
| label0 | string (30) | "Your order number" constant |
| text0 | string (80) | Marketplace abbreviation (2) + order number (9) + "Thank you for using DHL Express", e.g. for provider eb123456789, Thank you for using DHL Express. |

Feedback about Payment Procedure

After the user has paid via GiroPay, the PaySolution server sends a confirmation of the payment to the URL stored in the ControlCenter (application of the payment provider). This URL could be defined as follows:

http://pop.dhl.de/GiroPay/confirm.do

This presupposes that a response from the interface will arrive within a defined period of time.

The following parameters are transferred in the response.

| Parameter | Type | Description | Example |
|---|---|---|---|
| orderID | string (17) | Unambiguous procedure number for all marketplaces | 06062613225265 |
| amount | fixed decimal point number | The amount to be paid | 0.01 |
| currency | string (3) | Currency code according to ISO 4217. Here, the currency configured for the marketplace is used (in Phase I, exclusively euros). | EUR |
| basketID | string (50) | Shopping cart ID | 06062613225281 |
| rc | number (4) | Return code of the GiroPay server | 4000 |
| directPosErrorCode | number (3) | Primary return code of the system, containing information about the outcome of the payment. Possible values are '0' for successful and, for example, '100' for failed or aborted payments. | 0 |
| directPosErrorMessage | string (50) | Return code as text | Transaction authorized |
| Mac | string (50) | Message authentication code, serves to secure against manipulation of the shop notification | 7732a717b57f0a62a06c6ef45c0162b76096c266 |
| retrefnum | string (32) | GiroPay transaction ID | SEOWQTYZKT |
| trefnum | string (20) | Transaction number PaySolution service | 06062613225265_01 |

Using the parameter basketID, the application can now load the shopping cart (possibly HTTP session) from the database.

Subsequently, the application checks whether the indicated amounts and currency match those in the shopping cart. Moreover, a checking procedure is carried out using the message authentication code (MAC) that is also supplied along with the response. The MAC is formed on the basis of the values of all of the transmitted parameters in alphabetical order.

If there is no match, an error message is displayed on NOW3 and, of course, a message to this effect is logged.

After the shopping cart has been successfully checked, the actions for the delivery of the product are carried out (ESI/GLOBUSS, e-mail to the user, TAS-/Express pick-up order, etc. pp.).

The user can now download the PDF documents onto NOW3.

Return from GiroPay to the Application

As a response to the feedback of the payment procedure, POP sends the URL for the return to the PaySolution server.

This is done in the form of a URL-coded document that contains merely the parameter "rurls". The response to the notification is given as promptly as possible.

The PaySolution server carries out a redirect in the browser of the user to the sent URL. The return address then looks, for example, like this:

rurls=http%3A%2F%2Fpop.dhl.de%2FGiropay%2Fresponse.do;jsessionid=1234 123

Another preferred payment system is the PayPal payment system.

Preferred interfaces for incorporation of the PayPal payment system are described below:

PayPal Interface

The billing for the products and services ordered by the user is carried out via the interface. The communication between the application and PayPal is carried out via an encrypted (128-bit key length) HTTP request (GET or POST).

Use of the Interface

The invoicing for a procedure is carried out with the PayPal option:

"Buy Now and Donations". The total amount including tax is sent to the PayPal system and settled.

Method used for Checking the Payment Transaction

The PayPal interface offers two methods for checking the status and the correctness of the payment transaction.

IPN (Instant Payment Notification)

With IPN, PayPal addresses a URL of the application that is permanently defined in the configuration of the vendor account at PayPal. The status and data of the payment procedure are transmitted to the application via parameters.

IPN is asynchronous to the payment sequence. The point in time at which an IPN is generated cannot be guaranteed by PayPal. The IPN is processed by the application, even after the end of the user session.

As a rule, an IPN is triggered immediately after the confirmation of the payment on the PayPal pages.

PDT (Payment Data Transfer)

In the PDT method, the application retrieves the status of the payment procedure by a request to the URL https://www.

PayPal.com/cgi-bin/webscr. See PayPal sequence in the positive case, Step 5. For this purpose, a parameter set with the following parameters is transmitted in a point-to-point connection via HTTPS:

| Field name | Type | Description |
|---|---|---|
| cmd | string | "_Notify-synch" constant |
| tx | string | During the redirect by PayPal, the transaction ID is transmitted back to the application in the parameter tx |
| at | string | Vendor identification. This is issued by PayPal during the configuration of the vendor account and stored in the configuration of the application. |

In the PDT method, the return parameters are delivered by PayPal as key-value pairs in the body of the response. Unlike with IPN, in the PDT, a string is additionally transmitted in the first line, and this string is marked with the value "SUCCESS", indicating that the PDT request was successful from a technical standpoint.

The data transmitted to the application by PayPal in the IPN and PDT methods in the response is identical in terms of the parameters that are relevant for the application:

| Field name | Type | Description |
|---|---|---|
| payment_status | string | Status of the payment, see: PP_OrderManagement_IntegrationGuide.pdf TABLE A.3 |
| mc_gross | fixed decimal point | Total amount |
| mc_currency | string (3) | Currency in ISO3. (in Phase I, only euros). |
| custom | string (255) | Contains the shopping cart ID assigned by the application to the payment procedure. This shopping cart ID is used by the application for the assignment in the database. |

Sequence

It is advantageous to carry out the method in such a way that, with PayPal (via PayPal's own shop configuration), the only payment options activated are those that, at the latest at the time of reentry into the application, allow an unambiguous statement from PayPal along the lines of "paid" or "aborted/not paid". A "pending" status is ignored or interpreted as "not paid" by the application.

Figure 5:
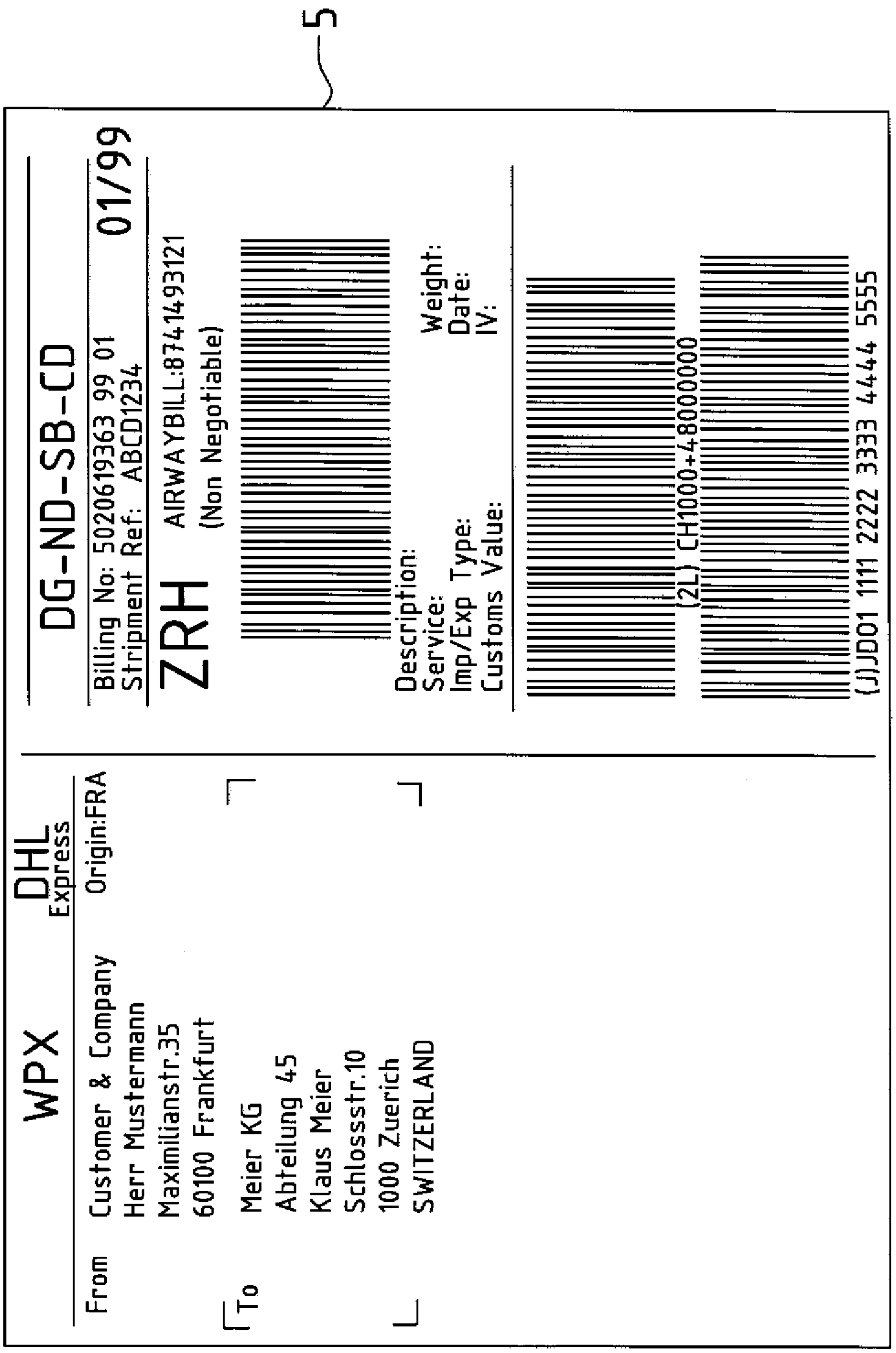
FIG. 5 is a label produced according to an exemplary embodiment of the present invention.

FIG. 5 shows a flowchart for the execution of a PayPal payment procedure.

PayPal Sequence in the Positive Case

1. A PayPal button (POST form) is offered on the NOW1.
2. A POP post form directs the user to PayPal.
3. Optionally after the payment has been made, PayPal sends an IPN (Instant Payment Notification) to the application, even before the user is directed back to the POP application. If the transaction is reported as having been paid within the IPN, then the actions for the delivery of the PDFs are carried out (EDICC, sending of an e-mail, etc.). This ensures that the user also receives e-mail if he or she closes the browser immediately after the payment at PayPal and the application no longer receives the redirect from PayPal on a POP page.
4. PayPal directs the user back to a page of the POP application via a post or via a redirect.
5. After the redirect from PayPal back to the POP application, it is checked whether an IPN was already received. If no positive IPN was received, then a query about the status of the shipment is submitted to the POP application employing the PDT method. If this is reported by PayPal as having already been paid, the actions for the delivery of the PDFs are performed (EDICC, sending of an e-mail, etc.).
6. The page for the PDF download (NOW3) is shown to the user.
7. Subsequent IPN messages that are sent by PayPal to the POP application are ignored by the application.

As a matter of principle, all of the IPN and PDT messages—also those relating to the workflow that are ignored by the application—are logged in the database so that they can still be reconstructed at a later point in time via Adminweb.

The asynchronously arriving IPN and PDT have to be synchronized via the database.

PayPal Integration Button

On the NOW1 page, there is a PayPal button. This button does not lead directly to the PayPal page, but rather opens a popup in which the user is prompted to check his or her e-mail once again.

Note:

If the e-mail was already set by the maptos request, then the popup is not shown but rather the page is called again directly.

Once the user has confirmed the correctness of his or her e-mail address, the NOW1 page is loaded once again. In this request cycle, the application checks the shopping cart once again with an eye toward any price changes or other inconsistencies (missing information).

If the shopping cart price remains unchanged, then the following actions are carried out:

Generation of the document definitions in the database (Document ID).

Generation of the shopping cart in the database (shopping cart ID).

Note:

The shopping cart that is persisted in the database contains only the data that is necessary for checking the transaction and for additional steps after the payment (displaying NOW3, generating the e-mail, etc).

Display of the NOW1 page

Instead of the PayPal button with the reference to the e-mail configuration popup, now a PayPal-Buy-Now HTML form is stored. The target URL of this form now refers to the PayPal platform. This form is immediately executed—controlled by Javascript—so that the browser immediately jumps to PayPal.

In the PayPal-Buy-Now HTML form, the following fields are filled in:

Aim of the form, for example:

https://www.sandbox.PayPal.com/cgi-bin/webscr

| Field name | Type | Description |
|---|---|---|
| cmd | string | "_xclick" constant |
| business | e-mail | DHL account e-mail. This has to be appropriately configured in PayPal. e.g. popPayPal@dhl.com |
| item_name | string (128) | One-line description of the product to be purchased. This is displayed to the user in PayPal. |
| item_number | string (128) | Text with shopping cart ID. Visible to the user |
| custom | string (255) | Shopping cart ID. Is not displayed to the user |
| amount | fixed decimal point | The amount to be paid |
| no_shipping | Boolean | Is always set to 1. |
| return | URL | Return URL in case of success. See remark about return URL in the text below. |
| cancel_return | URL | Return URL in case of error or abort. See remark return URL in the text below. |
| no_note | Boolean | Always "1" |
| currency-code | string (3) | Currency in ISO3. Here, the currency configured for the marketplace is used. (in Phase I, only euros). |
| lc | string (2) | Country of the buyer as ISO2. Here, the country configured for the marketplace is used. |
| bn | string | Payment method. Always "PP-BuyNowBF". |

These fields (except for cmd) are not encoded within the form as individual HTML form fields, but rather stored in the HTML form field in encrypted form according to the Public-Key RSA 1024-bit method, so that a manipulation by the user can be ruled out. The Public-Key is issued by PayPal and configured within the application.

Return Addresses:

Return addresses are structured as follows:

http://pop.dhl.de/PayPal/success;jsessionid=123456

The session of the application is attached to the URL.

Return from PayPal to the Application

After the user has paid the amount at PayPal, then PayPal triggers a return to the return URL. The following parameters are transmitted in the return:

| Field name | Type | Description |
|---|---|---|
| tx | string | PayPal transaction number. This parameter is mandatory so that the association of the transaction with the shopping cart can be created in the next step via the PDT method (see below). |
| st | string | Status of the payment: Is ignored by the application. The status check is carried out only on the basis of the data from the PDT or IPN method. |
| amt, cc, cm, sig, * | string | Other parameters are ignored by the application. |

Checking the Payment

If the user has not aborted the payment procedure and if the payment has been made, the user is returned to the application. If the status of the shopping cart does not say "paid" at this time, then the payment procedure is checked at PayPal on the basis of the return parameter tx employing the PDT method.

If the first line does not contain the value SUCCESS or if the parameter payment_status is not equal to "completed", the application assumes that the payment could not be successfully completed. In this case, an error message is shown to the user on NOW3. In all other cases, the application checks the data of the payment transaction. For this purpose, the relationship with the corresponding shopping cart is created in the database of the application via the custom parameter that contains the shopping cart ID.

The value of the parameter "mc_gross" is compared to the amount in the database.

The value of the parameter "mc_currency" is compared to the currency in the database.

If the values match, the shopping cart of the user is marked as "paid". If these values do not match, an error message is displayed on NOW3.

After the shopping cart has been successfully checked, the actions for the delivery of the product are carried out (ESI/GLOBUSS, e-mail to the user, TAS-/Express pick-up order, etc. pp.).

The user can now download the PDF documents onto the NOW3.

Since an IPN occurs asynchronously, a status associated with the shopping cart is set to "being processed" by the application in case of a successfully completed payment transaction in the database.

Cancel

If the user has aborted the payment procedure, and if the HTTP session is still valid, the user is again directed to NOW1 with his or her shopping cart. If the user has aborted the payment procedure, but if the session could not be continued within the application because of a timeout, NOW3 is displayed to the user with a corresponding error message.

In order to secure the system against fraudulent use and in order to achieve a fast, reliable and secure execution of changes, it is advantageous to provide a secured administration system.

In an especially preferred embodiment, the administration system is an administration web.

Preferably, the administration web is part of the POP web application.

It is advantageous to log the actions of the administration web.

If a user modifies configuration data of the application, these actions are logged in the reporting tables with a username and a time stamp.

User Management

The user management of the administration web is controlled via a simple configuration file that is administered with versioning via the configuration repository.

A list of roles is assigned to each user. These roles correspond to the rights for the use of the individual components (i.e. masks) of the administration web.

With the presented system, a method for generating a label that can be applied onto a mailpiece can be executed in various advantageous ways.

In particular, the method is carried out in such a way that a network node (maptos) provides a data service that is performed in at least one provider server of a service provider, whereby data for incorporation into the label is generated.

The data service is, for example, an Internet service.

The generation of the label is controlled in such a way that printing of the label is only made possible once a checking step has been carried out. The checking step serves, for example, to check the validity of a voucher or to check whether a requested franking label has been paid for.

Moreover, it is advantageous to check whether a requested franking label has already been printed before. In this case, it is prevented that the franking label is printed out again.

It is especially advantageous to provide the labels or printing master copies as intelligent documents for generating the labels.

Here, it is advantageous for a program module to be incorporated into the intelligent document, said program module being configured to create displayable information indicating the result of the checking step or of an additional checking step in order to check whether the precondition has been met within the intelligent document.

A refinement of this provides that at least one of the checking steps is carried out by the program module.

One or more additional checking steps can be carried out in the provider server, in the network node or in another server-based computing unit.

Moreover, it is advantageous that the checking step checks whether the program execution environment is available.

In order to prevent fraudulent multiple print-outs, it is advantageous for a program to control a one-time printing of the label and for an intelligent document to be transmitted from a server via network to a client.

In order to further increase the data security, the method is carried out in such a manner that, when the label is printed for the first time, a message is transmitted from the user client to the server, and that the printing is logged in the server on the basis of the message.

In order to ensure that server-based security mechanisms can be used, the program that serves to control the printing of the labels is configured in such a way that it can only be executed when a network connection exists between the client and the server and when, on the basis of a query to the server, it has been ascertained that that label had not been printed before.

In an especially secure embodiment, this is done in that, in at least one of the checking steps, it is ascertained whether access to the network exists.

An embodiment provides that, in at least one of the checking steps, a query to the server is made in which it is checked whether contents of the intelligent document have already been printed before.

In the manner thus presented, it is possible to allow authorized users to print out labels in a simple and reliable manner. At the same time, fraudulent production of labels is prevented.

In particular, an exemplary embodiment of the present invention also makes it possible to use vouchers (codes) for generating labels.

The vouchers can be, for example, prepaid postage amounts or vouchers for ordering or delivery procedures.

The vouchers preferably contain monetary-value information. In a refinement of an exemplary embodiment of the present invention, they can also be used for payment procedures.

Moreover, it is possible to transmit the vouchers to recipients of merchandise shipments. The recipients of the merchandise shipments, as users of the system, can also generate labels. Therefore, in the manner according to an exemplary embodiment of the present invention, it is possible to produce labels as return labels for returning mailpieces to an original sender—especially to a mail-order company.

In order to produce a label that serves as a return label, a voucher is transmitted to a user via a first transmission route. Later—especially if the user wishes to return a shipment or a product contained therein—the voucher (code) is transmitted to a server by an operating unit located in the sphere of influence of the user.

This refinement of an exemplary embodiment of the present invention provides for a multi-step production of a label. This multi-step production is characterized in that, via a first transmission route, a voucher is transmitted to a user, that the voucher is transmitted to a server by an operating unit located in the sphere of influence of the user and that the server executes a checking step in order to check the voucher and, as a function of the result of the checking step, influences the production of the label.

The voucher can be transmitted to the user in various ways.

A refinement of an exemplary embodiment of the present invention provides for the voucher or for a constituent of the voucher to be transmitted to the user via different transmission routes.

A transmission to the user is also carried out when the voucher or a constituent of the voucher is transmitted to an operating unit located in the sphere of influence of the user.

This is the case, for example, with a transmission to a computer or to a mobile user terminal device such as a mobile telephone.

A refinement of the method, of the computer program product and of the device is characterized in that the voucher is added to a mailpiece addressed to the user.

An embodiment of the method, of the computer program product and of the device provides for the voucher to be transmitted to the user electronically.

A refinement of the method, of the computer program product and of the device is characterized in that the voucher is transmitted to the user when a given event occurs.

An embodiment of the method, of the computer program product and of the device provides for the voucher to be transmitted when a shipping event occurs.

A refinement of the method, of the computer program product and of the device is characterized in that the voucher is transmitted in response to a request of a user.

An embodiment of the method, of the computer program product and of the device provides for the operating unit to be a computer.

A refinement of the method, of the computer program product and of the device is characterized in that the checking step comprises a validity check of the voucher.

An embodiment of the method, of the computer program product and of the device provides for the checking step to comprise a validity check of the voucher.

A refinement of the method, of the computer program product and of the device is characterized in that, taking the voucher into account, a recipient address is ascertained for the mailpiece.

An embodiment of the method, of the computer program product and of the device provides that, taking the voucher into account, a sender address is ascertained for the mailpiece.

An exemplary embodiment of the present invention also comprises documents that cannot be displayed graphically. Documents may comprise SmartLabels. SmartLabels are RFID identification devices (transponders). They are suitable to be used for control processes in the processing or transporting of physical objects, especially of mailpieces or other goods that are to be transported.

The use of identifier data further increases data security. The identifier data is preferably recognized by the fact that a signature is generated for the particular dynamic content and that this signature is transmitted along with the particular dynamic content.

Advantageously, the signature is once again generated at the destination of a completed communication (destination system), and the resultant value—especially a hash value—is compared to the value resulting from the transmitted signature.

Through a comparison of the values, it is possible to prevent a manipulation of the contents since the appertaining application logic only becomes active if the checks have transpired correctly.

An exemplary embodiment of the present invention also comprises the use of other programs than those presented.

In particular, it is possible to use other computer programs than those presented above, while employing the presented embodiment of the system and of the device.

By the same token, it is possible to use other file formats.

The software selected should be such that it can generate a file having the following properties:

1. Downloading the file should be possible.
2. Displaying and printing the label in the same form (frames, logos, variable texts) should be possible.
3. Printing barcode labels should be possible, ideally by integrating fonts.
4. It should be possible to use/activate an application logic (via Java Script, Visual Basic, .net, . . . ) in the file.
   This property is also achieved, for example, by Adobe Flash and by many Microsoft/Windows products from the Office environment.

4.1 Soap requests (HTTP requests) should be possible.

4.2 It should be possible to actuate a print dialog via the application logic.

5. It should be possible to transmit the file write-protected.
6. The file should be protected against changes to the application logic before or during the execution (especially during printing).

These requirements are also met, for example, by Microsoft Excel. In order to increase data security, an appropriate additional encryption is recommended for the embedded script code, which should be additionally secured.

It is advantageous to configure the intelligent documents in such a way that they make it possible to check program versions.

In particular, it is advantageous for the documents to be capable of checking which version or which implementation of a computer program and/or which operating system is installed on a client.

An exemplary embodiment of the present invention is not limited to the areas of application presented.

When labels are generated for mailpieces, it is advantageous for them to contain information about identification, about routing, about advance postal instructions and about extra services associated with the shipping order.

Moreover, it is advantageous for the labels to contain customer and/or billing information.

The presented labels serve as information carriers and allow, for example, the acceptance, payment accounting, sorting, loading, special handling, delivery, issuing, billing, investigating, reworking, operating data processing, tracking and tracing, as well as archiving of a shipment.

In refinements of an exemplary embodiment of the present invention, the intelligent documents—especially the labels that are to be applied onto the mailpieces—contain information blocks. Here, it is advantageous to specify data types and/or data sizes for the information blocks. This specification is advantageously carried out in accordance with the specific logistical requirements.

Examples of dynamic contents that are inserted into the static frame are recipient address and information that allows shipment identification, for example, a shipment identification number.

The transmitted frame information serves to provide a clear, structured and formatted display of the dynamic contents.

FIG. 5 shows a graphic depiction of intelligent documents created according to an exemplary embodiment of the present invention. The graphic depictions can be displayed, for example, on a monitor of a client or printed out and, if applicable, printed out for use as a shipping label for a mailpiece.

In order to create the documents, static contents are transmitted separately from the dynamic contents.

The static contents are, for example, the frame drawn in the figures as well as company information such as "DHL".

Dynamic contents that are inserted into the shipments include, for example, sender information, recipient information, account number, size information, shipment identification number and/or optionally also a product designation.

FIG. 5 shows the label content by way of an example in a DIN A4 landscape format, placed next to each other.

For the person skilled in the art, it is a matter of course to select the specific graphic design of the label, including the depicted information—plain text components and machine-written components as well as, optionally, encrypted information—depending on the requirements of the shipping company that is transporting or handling the mailpieces.

In a refinement of an exemplary embodiment of the present invention, the dynamic contents are transmitted in electronic form by a party (sender) ordering a shipping procedure. The shipment data can be electronically transmitted before, during and after the shipments have been physically handed over to a shipping company.

A simultaneous electronic and physical transfer, however, is preferred in order to simplify the logistical processes.

In order to transmit the data, preferably a suitable set of numbers is prescribed.

Moreover, the labels can contain handling information, for example, for employees of the shipping company, especially for a deliverer. It is possible and practical to select a format that differs from other label contents for the graphic representation of individual handling functions.

The description above of exemplary embodiments of the invention making reference to the figures is intended to serve as an illustration and an example. An exemplary embodiment of the present invention is not restricted to the embodiments presented.

In conjunction with the printing of labels by an intelligent document, an exemplary embodiment of the present invention is especially not limited to the presented types of transmission, types of formats or checking steps. On the contrary, the person skilled in the art recognizes that, within the scope of an exemplary embodiment of the present invention, other types of transmission can also be selected and/or other formats can be used and/or other checking steps can be carried out, whose results are presented in the document, if applicable.

The person skilled in the art also realizes that an exemplary embodiment of the present invention can be used in other areas than those presented.

Thus, for example, it is possible to check the presence of the program execution environment in any desired intelligent document and to display the result of the checking.

The intelligent documents can be, for example, intelligent documents with animated graphics or forms. In particular, an exemplary embodiment of the present invention can be used with forms that are configured as intelligent documents and that are used in communication with official agencies. On the basis of checking steps whose results are displayed with an exemplary embodiment of the present invention, it is possible, in particular, to check whether certain required fields of a form have been filled in.

Moreover, an exemplary embodiment of the present invention can also be used with intelligent documents that are protected against unauthorized access using the "intelligence". In this context, texts should be mentioned that can only be displayed and/or printed if the user is authorized to do so, whereby the authorization of the user is checked, for example, by a query made to the server by the intelligent document via a network.

The different handling of dynamic and static contents allows far-reaching configuration possibilities for individual documents or for documents that are to be created at time intervals and/or that are to be updated.

Online franking solutions are advantageous for purposes of improving return logistics processes, whereby it is possible to lower process costs as well as to optimize information transparency.

The term "return logistics processes" refers to logistics processes for handling returns.

An exemplary embodiment of the present invention comprises the refinement of a logistics system as a return logistics system as well as the configuration of a logistics system with handling procedures for handling returns.

An exemplary embodiment of the present invention comprises a logistics system for conveying a mailpiece along a transport route within a postal distribution network, whereby the transport route comprises several nodes of the postal distribution network, especially a node that corresponds to a delivery point.

If applicable, the transport route also comprises one or more nodes that each correspond to a sorting point.

As used herein, the term "logistics system" is to be understood in its broadest sense. In particular, it comprises systems containing devices to carry out the transport of mailpieces from an origination site to a delivery point along a transport route within a postal distribution network.

The origination site is, for example, a storage site or drop-off site of the object that is to be transported. The delivery point is preferably selected by the party ordering the transport or else the delivery point is automatically prescribed to the ordering party. In case of a return, this is, for example, a warehouse of a mail-order company or manufacturer.

In the manner described, the labels can be transmitted quickly, reliably and demand-controlled. In particular, it is possible to take into account requests from a shipping service provider that initially sends an article to the user in a first mailing and desires a systematic return of the articles in a second mailing.

According to an exemplary embodiment of the present invention, this is advantageously done in that a voucher is transmitted to a user via a first transmission route, in that the voucher is transmitted to a server via an operating unit located in the sphere of influence of the user, and in that the server executes a checking step for checking the voucher and, as a function of the result of the checking step, influences the production of the label.

The voucher is advantageously transmitted when a shipping event occurs, for example, when a mailpiece addressed to the user is dropped off, when a transportation or processing step of the mailpiece is carried out, or when the mailpiece is delivered to the user.

An exemplary embodiment of the present invention comprises various kinds of transmission of the voucher and allows the integration of various transmission modalities.

In order to ensure an especially high level of data security, the checking step is carried out in such a way that it comprises a validity check of the voucher.

In order to accelerate the processing, it is advantageous for a recipient address for the mailpiece to be ascertained, taking the voucher into account.

Moreover, it is advantageous to ascertain the sender address for the mailpiece, taking the voucher into account.

Glossary

Exemplary definitions of some of the terms used herein are set forth below:

TAS pick-up
: Fixed-date pick-up system

User
: Final user who uses the POP application in order to buy postage indicia or vouchers.

Application
: The web application ParcelOnlinePostage.

Basic product
: "Parcel", "10-kg package", "20-kg package"; is used, for example, for the grouping within the product selection.

Module
: Rectangular static surface in a website that can pop up in a time-controlled and marketplace-controlled manner.

BLNN
: COD without receipt

BHNN
: COD with receipt

Document ID
: Unambiguous number by which a user can reference a postage indicium he or she has purchased.

EKP number
: A type of customer number for the marketplace.

ESI
: Payment assurance (means to detect fraudulently produced labels).

Voucher
: An instance of a voucher type; can be identified via an unambiguous voucher code.

Voucher type
: A class of a voucher.

Customer
: This term is not used since it is ambiguous.

LP
: License plate.

Marketplace
: Each user session is associated with a marketplace that prescribes some boundary conditions such as the currency.

PALS
: Photo addresses reading system.

PAN
: Pre-advice notification.

POC
: Proof of collection.

POD
: Proof of delivery.

POM
: Proof of money.

POT
: Proof of transport.

Product
: A combination of basic product and services; it is identified via a product key.

Product code
: Numeric, two-digit code for a basic product.

Product key
: Unambiguous key for a basic product/service combination.

Service

Fee-based property of a product.

Shopping cart ID

On the basis of this unambiguous number, a user can reference his or her shopping cart in case of support questions.

| List of reference numerals: | |
|---|---|
| 301 | PDF template |
| 302 | POP web server |
| 303 | document data record |
| 304 | licensing information |
| 305 | intelligent document (example iPDF) |
| 306 | ARES |

What is claimed is:

1. A method for producing a label that can be applied onto a mailpiece, the method comprising:

providing a data service via a network node, the data service being performed in a provider server of a service provider;

performing a one-time printing of the label via a control program, such that an intelligent document is transmitted from the provider server via a network to a user client, wherein:

a program module is incorporated into the intelligent document;

the program module is configured to create displayable information indicating a result of a checking step, or of an additional checking step in order to check whether a precondition has been met within the intelligent document;

the intelligent document is an intelligent PDF (iPDF) comprising the displayable information, wherein an unambiguous document ID is embedded into the iPDF, and the displayable information comprises static content and dynamic content, wherein incorporation of the dynamic content into the intelligent document is carried out separately and at a different time from incorporation of the static content;

at least one of the checking steps comprises querying the provider server to check whether contents of the intelligent document have been printed; and the one-time printing being done if a network connection exists between the user client and the provider server, and if, on the basis of a query to the provider server, it has been ascertained that that label had not been printed before;

transmitting a message from the user client to the provider server when the label is printed for the first time; and logging the printing in the provider server in response to the message.

2. The method recited in claim 1, wherein the data service comprises an Internet service.

3. The method recited in claim 1, comprising:

performing a checking step to check a voucher; and influencing the production of the label based on the result of the checking step.

4. The method recited in claim 3, comprising transmitting the voucher to a user prior to the checking step.

5. The method recited in claim 3, comprising checking whether the program execution environment is available as at least part of the checking step.

6. The method recited in claim 1, wherein at least one of the checking step or the additional checking step is performed by the program module.

7. The method recited in claim 1, comprising checking whether access to the network exists in at least one of the checking step or the additional checking step.

8. The method recited in claim 1, comprising checking the version of the program execution environment in at least one of the checking step or the additional checking step.

9. A tangible, non-transitory, machine-readable medium that stores machine-readable instructions that are executable by a computer to produce a label that can be applied onto a mailpiece, the tangible, machine-readable medium comprising:

machine-readable instructions that, when executed by a computer, provide a data service via a network node, the data service being performed in a provider server of a service provider;

machine-readable instructions that, when executed by a computer, perform a one-time printing of the label via a control program, such that an intelligent document containing a program module is transmitted from the provider server via a network to a user client, wherein:

the program module is configured to create displayable information indicating a result of a checking step or of an additional checking step, in order to check whether a precondition has been met within the intelligent document;

the intelligent document is an intelligent PDF (iPDF) comprising the displayable information, wherein an unambiguous document ID is embedded into the iPDF, and the displayable information comprises static content and dynamic content, whereby incorporation of the dynamic content into the intelligent document is carried out separately and at a different time from incorporation of the static content; and the one-time printing being done if a network connection exists between the user client and the provider server, and if, on the basis of a query to the provider server, it has been ascertained that that label had not been printed before;

machine-readable instructions that, when executed by a computer, transmit a message from the user client to the provider server when the label is printed for the first time; and machine-readable instructions that, when executed by a computer, log the printing in the provider server in response to the message.

10. A system for production and printing of a label that can be applied to a mailpiece, the system comprising:

means for providing a data service, the data service being performed in a provider server of a service provider;

means for performing a one-time printing of the label via a control program, such that an intelligent document comprising a program module is transmitted from the provider server via a network to a user client, wherein the intelligent document is an intelligent PDF (iPDF) comprising displayable information, wherein:

an unambiguous document ID is embedded into the iPDF;

the displayable information comprises static content and dynamic content, wherein incorporation of the dynamic content into the intelligent document is carried out separately and at a different time from incorporation of the static content; and the one-time printing being done if a network connection exists between the user client and the provider server, and if, on the basis of a query to the provider server, it has been ascertained that that label had not been printed before;

means for transmitting a message from the user client to the provider server when the label is printed for the first time; and means for logging the printing in the provider server in response to the message.

11. The system recited in claim 10, comprising a network node that provides the data service.

* * * * *